(12) United States Patent
Dallaire et al.

(10) Patent No.: US 9,742,594 B2
(45) Date of Patent: Aug. 22, 2017

(54) SYSTEM AND METHOD FOR ADJUSTING CLOCK PHASES IN A TIME-INTERLEAVED RECEIVER

(71) Applicant: INPHI CORPORATION, Santa Clara, CA (US)

(72) Inventors: Stephane Dallaire, Gatineau (CA); Benjamin Smith, Ottawa (CA)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/372,051

(22) Filed: Dec. 7, 2016

(65) Prior Publication Data

US 2017/0118046 A1 Apr. 27, 2017

Related U.S. Application Data

(63) Continuation of application No. 14/921,251, filed on Oct. 23, 2015, now Pat. No. 9,559,877.

(51) Int. Cl.
  *H04L 7/033* (2006.01)
  *H04L 25/03* (2006.01)
  *H04L 7/027* (2006.01)

(52) U.S. Cl.
  CPC ........ *H04L 25/03006* (2013.01); *H04L 7/027* (2013.01)

(58) Field of Classification Search
  CPC . H04L 7/033; H04L 7/0337; H04L 25/03057; H04L 7/0062; H03L 7/0814
  USPC .................. 375/371, 232, 233; 327/155, 156
  See application file for complete search history.

(56) References Cited

U.S. PATENT DOCUMENTS

| 7,099,400 | B2* | 8/2006 | Yang ....................... H03L 7/087 375/287 |
| 7,529,296 | B2 | 5/2009 | Jaussi et al. |
| 9,209,825 | B1 | 12/2015 | Visani et al. |
| 9,467,315 | B2 | 10/2016 | Dallaire et al. |
| 2004/0234002 | A1 | 11/2004 | Yang et al. |
| 2011/0021170 | A1 | 1/2011 | Kolze et al. |

(Continued)

OTHER PUBLICATIONS

Yang et al, "High-Performance Adaptive Decision Feedback Equalizer Based on Predictive Parallel Branch Slicer Scheme", 2002, IEEE Workshop on Signal Processing Systems (SIPS'02), San Diego, CAL, USA, Oct. 16-18, 2002, pp. 121-126 (6 pages total).

(Continued)

*Primary Examiner* — Khai Tran
(74) *Attorney, Agent, or Firm* — Richard T. Ogawa; Ogawa P.C.

(57) ABSTRACT

Clock timing skew may occur during operation of a time-interleaved receiver. It would be beneficial to try to determine if there is timing skew, and if there is, then address it, such as by reducing or eliminating some or all of the timing skew. Embodiments are described herein that may achieve this. In one embodiment, a method includes generating at least two clocks having the same frequency but a different phase. Intersymbol interference (ISI) values are then determined, one for each of the clocks, by: for each clock, sampling a signal using the clock and determining a value representing ISI based on the sampled signal. A clock phase of at least one of the clocks is adjusted in response to at least one of the ISI values being different from a reference ISI value.

16 Claims, 13 Drawing Sheets

(56) References Cited

U.S. PATENT DOCUMENTS

| | | |
|---|---|---|
| 2011/0051854 A1 | 3/2011 | Kizer |
| 2011/0068840 A1 | 3/2011 | Williams et al. |
| 2011/0095927 A1 | 4/2011 | Pagnanelli |
| 2014/0064351 A1 | 3/2014 | Hidaka |
| 2014/0140389 A1 | 5/2014 | Chen |
| 2014/0226707 A1 | 8/2014 | Kaviani |
| 2014/0241477 A1 | 8/2014 | Eliaz |
| 2016/0028562 A1 | 1/2016 | Dallaire et al. |
| 2016/0056980 A1 | 2/2016 | Wang et al. |

OTHER PUBLICATIONS

U.S Office Action for U.S. Appl. No. 14/806,346, and dated Mar. 9, 2016, 20 pages.

U.S Office Action for U.S. Appl. No. 15/260,692, and dated Nov. 14, 2016, 5 pages.

U.S Office Action for U.S. Appl. No. 14/921,251, and dated May 10, 2016, 8 pages.

\* cited by examiner

SYSTEM AND METHOD FOR ADJUSTING CLOCK PHASES IN A TIME-INTERLEAVED RECEIVER

CROSS-REFERENCE TO RELATED APPLICATIONS

The following is a continuation application of U.S. patent application Ser. No. 14/921,251, which was filed on Oct. 23, 2015, and which is incorporated herein by reference.

FIELD

The following relates to addressing clock timing skew in a time-interleaved receiver.

BACKGROUND

Time interleaving is a technique used to increase the overall sampling rate of a system by using multiple sampling elements in parallel. For example, multiple slicers/samplers may be used in parallel in a serializer/deserializer application, or multiple sub-analog-to-digital converters may be used in parallel in a digital signal processing based receiver. By using time interleaving, higher bit rates may be achieved while keeping the clock frequency lower than if time interleaving was not used. This may result in lower power dissipation in the system compared to not using time interleaving.

In an N-way time interleaved receiver, an overall sampling rate $f_s$ may be obtained by using N sampling elements, with each of the sampling elements sampling at a (Efferent, equally spaced, phase of a clock that has a clock rate of $f_s/N$.

Implementing time interleaving may involve precise multi-phase clock generation, such as the creation of N clocks, with each one of the N clocks sampling at substantially exactly one sampling period $1/f_s$ from each other.

SUMMARY

Clock timing skew may occur during operation of a time-interleaved receiver. For example, clock timing skew may be caused by manufacturing variations in the clock generators, or manufacturing variations in the other circuit components in the clock path. It would be beneficial during operation of the receiver to try to determine if there is timing skew, and if there is, then address it, such as by reducing or eliminating some or all of the timing skew. Embodiments are described herein that may achieve this.

In one embodiment, a method is disclosed that is performed in a time interleaved receiver and includes generating a plurality of clocks, each one of the plurality of clocks generated to have the same clock frequency but a different clock phase. A plurality of intersymbol interference (ISI) values are determined, one for each of the plurality of clocks, by: for each clock of the plurality of clocks, sampling a signal using the clock to obtain a sampled signal and determining a value representing ISI based on the sampled signal. A clock phase of at least one of the plurality of clocks is adjusted in response to at least one of the plurality of ISI values being different from a reference ISI value.

In some embodiments, the reference ISI value is an average of the plurality of ISI values. In some embodiments, the method includes computing the average of the plurality of ISI values to obtain the reference ISI value. In some embodiments, the reference ISI value is an ISI value associated with one of the plurality of clocks.

In some embodiments, the signal sampled for each clock of the plurality of clocks is based on a same input signal. In some embodiments, the value representing ISI is determined for each clock of the plurality of clocks using a same method of determination.

In some embodiments, adjusting the clock phase of at least one of the plurality of clocks includes adjusting a clock phase of a selected one of the plurality of clocks in a direction dependent upon whether an ISI value associated with the selected one of the plurality of clocks is less than or greater than the reference ISI value.

In some embodiments, the method includes adjusting the clock phase of the selected one of the plurality of clocks by an amount dependent upon a difference in magnitude between the ISI value associated with the selected one of the plurality of clocks and the reference ISI value.

In some embodiments, the method includes: for a particular clock of the plurality of clocks, determining the value representing ISI based on the sampled signal by performing operations including: determining a decision value based on the sampled signal; determining an error value that is representative of a discrepancy or difference between the decision value and the signal prior to determining the decision value; and correlating the error value with at least a previous decision value, or with at least a future decision value, or with at least a previous decision value and a future decision value.

In some embodiments, determining the error value includes: sending the signal, prior to sampling, into another circuit branch; in the another circuit branch, adding or subtracting a DC offset from the signal to obtain a modified signal; sampling the modified signal using the particular clock to obtain a sampled modified signal; obtaining the error value from the sampled modified signal.

In some embodiments, the method includes: determining the decision value using a first circuit branch; determining the error value using a second circuit branch; changing which circuit branch is used to determine the decision value and which circuit branch is used to determine the error value during operation of the time interleaved receiver.

In some embodiments, the time interleaved receiver is a 4-PAM receiver or is part of a 4-PAM transceiver, and for each clock of the plurality of clocks there is a 4-PAM detector. In some such embodiments, the method may include, for a particular 4-PAM detector associated with a particular clock: in each one of four branches of the particular 4-PAM detector, adjusting an input signal by a respective offset to obtain a respective adjusted signal, and then using the particular clock to slice each respective adjusted signal; selecting one of the four branches as an offline branch, and using an output of the other three branches to form a data decision value; changing the offline branch during operation such that each one of the four branches is the offline branch at a respective different point in time during the operation and the remaining three branches form the data decision value; determining the value representing ISI associated with the particular clock using an output of the offline branch. In some embodiments, the value representing may be determined by correlating the output of the offline branch (error value) with at least a previous decision value, or with at least a future decision value, or with at least a previous decision value and a future decision value.

In another embodiment, a time interleaved receiver is disclosed that has one or more clock generator circuits to generate a plurality of clocks, each one of the plurality of clocks to be generated to have the same clock frequency but a different clock phase. The receiver further has circuitry to determine a plurality of intersymbol interference (ISI) values, one for each of the plurality of clocks, by: for each clock of the plurality of clocks, sampling a signal using the clock to obtain a sampled signal and determining a value representing ISI based on the sampled signal. The receiver further includes a timing skew determination module to receive the plurality of ISI values and instruct that a clock phase of at least one of the plurality of clocks be adjusted in response to at least one of the plurality of ISI values being different from a reference ISI value.

In some embodiments, the reference ISI value is an average of the plurality of ISI values, and the timing skew determination module is to compute the average of the plurality of ISI values to obtain the reference ISI value. In some embodiments, the reference ISI value is an ISI value associated with one of the plurality of clocks.

In some embodiments, the receiver further includes a plurality of circuit branches to receive a same input signal, and the signal sampled for each clock of the plurality of clocks is based on the same input signal. In some embodiments, the receiver is to determine the value representing ISI for each clock of the plurality of clocks using a same method of determination.

In some embodiments, the timing skew determination module is to instruct that the clock phase of at least one of the plurality of clocks be adjusted by: at least generating an instruction to adjust a clock phase of a selected one of the plurality of clocks in a direction dependent upon whether an ISI value associated with the selected one of the plurality of clocks is less than or greater than the reference ISI value. In some embodiments, the instruction is further to adjust the clock phase of the selected one of the plurality of clocks by an amount dependent upon a difference in magnitude between the ISI value associated with the selected one of the plurality of clocks and the reference ISI value.

In some embodiments, for a particular clock of the plurality of clocks, the circuitry to determine the value representing ISI based on the sampled signal is to: determine a decision value based on the sampled signal; determine an error value that is representative of a discrepancy or difference between the decision value and the signal prior to determining the decision value; and correlate the error value with at least a previous decision value, or with at least a future decision value, or with at least a previous decision value and a future decision value.

In some embodiments, the circuitry to determine the error value is to: send the signal, prior to sampling, into another circuit branch; in the another circuit branch, add or subtract a DC offset from the signal to obtain a modified signal; sample the modified signal using the particular clock to obtain a sampled modified signal; obtain the error value from the sampled modified signal.

In some embodiments, the receiver includes circuitry to: determine the decision value using a first circuit branch; determine the error value using a second circuit branch; change which circuit branch is used to determine the decision value and which circuit branch is used to determine the error value during operation of the receiver.

In some embodiments, the receiver is a 4-PAM receiver or is part of a 4-PAM transceiver, and for each clock of the plurality of clocks there is a 4-PAM detector, and a particular 4-PAM detector associated with a particular clock comprises four branches. In some such embodiments, each one of the four branches has: (i) an adjustor to adjust an input signal by a respective offset to obtain a respective adjusted signal, and (ii) a slicer to slice the respective adjusted signal using the particular clock. The particular 4-PAM detector may further include a selector to select one of the four branches as an offline branch, the offline branch selected to change during operation such that each one of the four branches is the offline branch at a respective different point in time during the operation and the remaining three branches form a data decision value. In some embodiments, the circuitry to determine the plurality of ISI values is to determine the value representing ISI associated with the particular clock using an output of the offline branch. In some embodiments, the value representing ISI may be determined by correlating the output of the offline branch (error value) with at least a previous decision value, or with at least a future decision value, or with at least a previous decision value and a future decision value.

In some embodiments, the receiver is a serializer/deserializer (SERDES) receiver or an advanced modulation receiver, or a receiver having a clock/data recovery (CDR) device, or a receiver having a decision feedback equalizer (DFE), or a receiver having a high speed analog/digital converter (ADC) for adaptive equalization of lossy transmission.

Other aspects and features of embodiments of the present disclosure will become apparent to those of ordinarily skill in the art upon review of the following description.

BRIEF DESCRIPTION OF THE DRAWINGS

Embodiments of the present application will be described, by way of example only, with reference to the accompanying figures wherein.

DETAILED DESCRIPTION

For illustrative purposes, specific example embodiments will now be explained in greater detail below in conjunction with the figures.

The embodiments set forth herein represent information sufficient to practice the claimed subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described nay be implemented using computer/processor readable/executable instructions that may be stored or otherwise held by such non-transitory computer/processor readable storage media.

Figure 1:
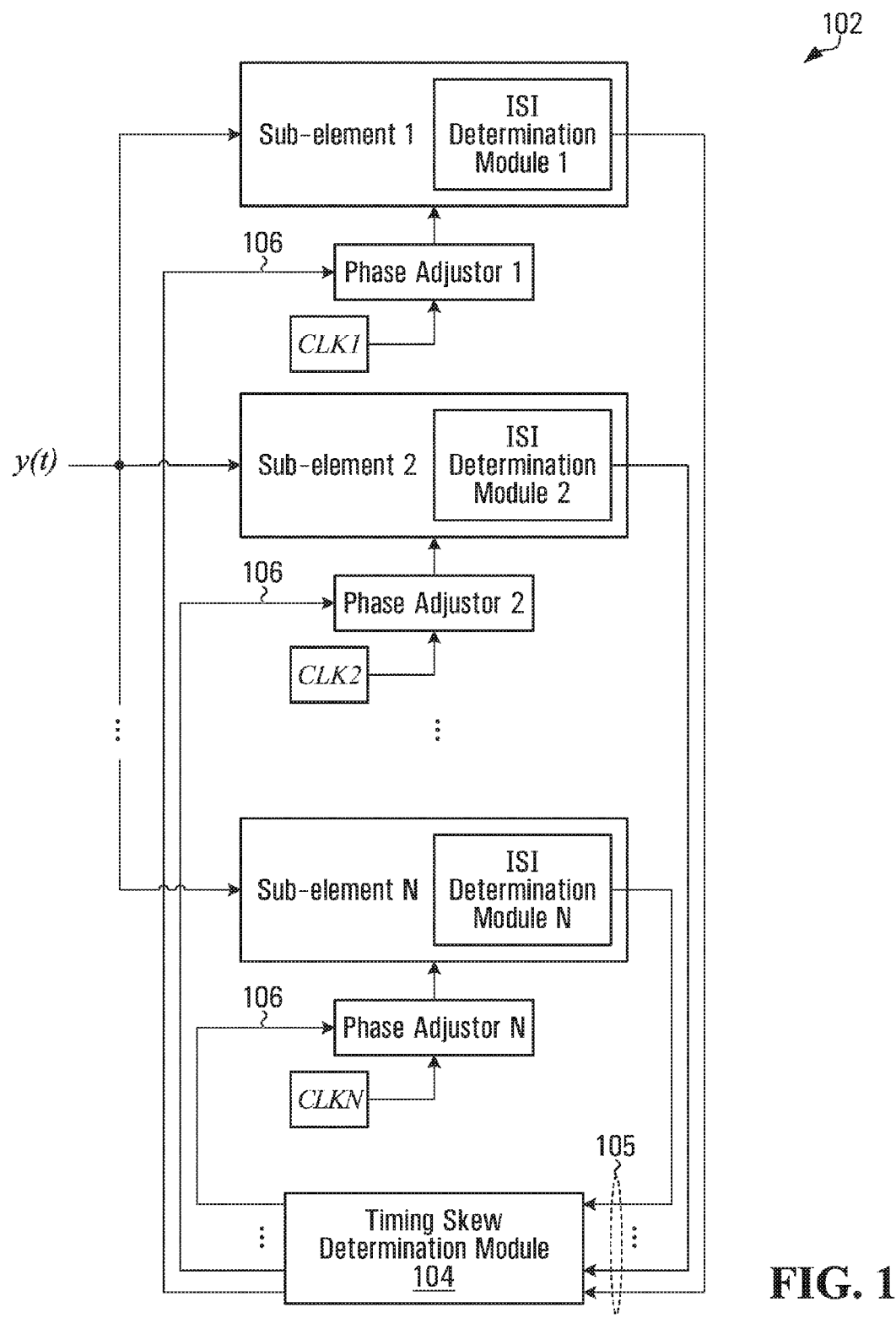
FIG. 1 is a simplified block diagram of one embodiment of time-interleaved receiver.

FIG. 1 is a block diagram of one embodiment of a time-interleaved receiver 102. The time-interleaved receiver 102 includes N circuit branches, with each of the N circuit branches receiving an input signal y(t), and each of the N circuit branches connected to a respective receiver portion or "sub-element". The sub-elements are labelled as sub-element 1 to sub-element N in FIG. 1. Each sub-element includes circuitry (not specifically shown in FIG. 1) to sample a signal, where the signal is either the same as or based on (e.g. a modified version of) the input signal y(t). Sampling the signal in each sub-element is done using a clock ("CLK"). Specifically, CLK 1 is used for sampling in sub-clement 1, CLK 2 is used for sampling in sub-element 2, . . . , and CLK N is used for sampling in sub-element N. Each CLK is generated by one or more clock generator circuits and is generated to have the same clock frequency, but a different clock phase. More particularly, the phase of each of CLK 1 to CLK N is generated such that the phases of the N clocks are equally spaced by 360/N degrees. However, even though the clocks are generated to have such equal phase spacing, in actual operation there may be some clock timing skew, which may be caused by factors such as manufacturing variations. In some applications timing skew may degrade performance, and therefore it is beneficial to try to detect and address the timing skew.

Figure 2:
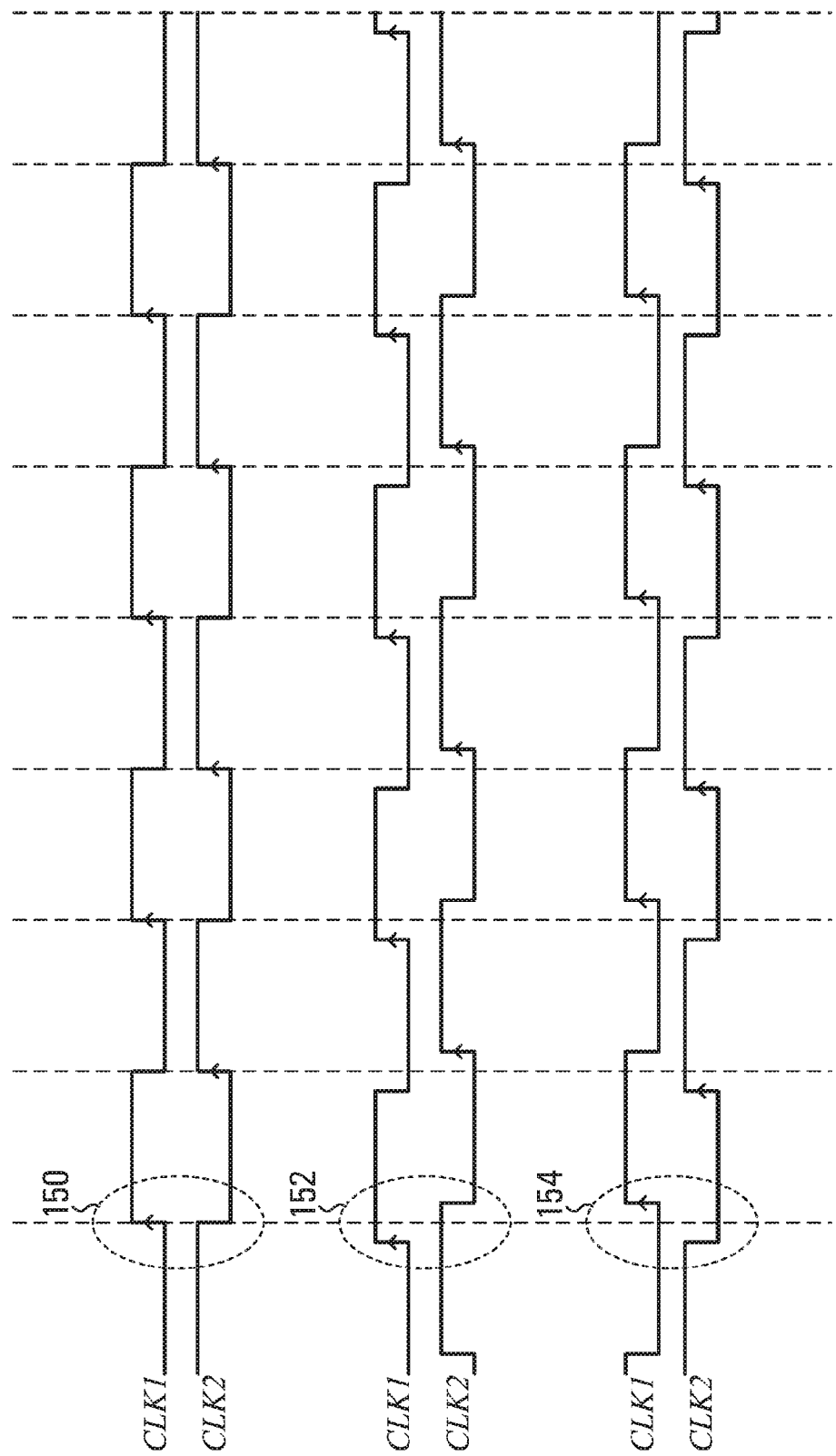
FIG. 2 is an illustration showing clock timing skew.

FIG. 2 illustrates an example of clock timing skew. Assume that N=2, such that there are two clocks CLK 1 and CLK 2 having the same frequency but a 180 degree phase difference. As shown at 150 in FIG. 2, CLK 1 and CLK 2 are generated to be ideally exactly 180 degrees apart. In this situation there is no timing skew. However, during actual operation, timing skew may occur such that CLK 1 leads CLK 2, as at 152. In this situation the rising edges of CLK 1 occur earlier than the ideal or average sampling times, and the rising edges of CLK 2 occur later than the ideal or average sampling times. As another example, timing skew may occur such that CLK 1 lags CLK 2, as at 154. In this situation the rising edges of CLK 1 occur later than the ideal or average sampling times, and the rising edges of CLK 2 occur earlier than the ideal or average sampling times. As discussed in more detail below, clock timing skew may be detected by using measurements or estimates of intersymbol interference (ISI) in the signals sampled using the clocks. The identified timing skew may then be corrected or mitigated by adjusting the phase of one or more of the clocks based on the ISI value(s).

Returning to FIG. 1, each of CLK 1 to CLK N has associated with it a clock phase adjustor, respectively labelled in FIG. 1 as "Phase Adjustor 1", "Phase Adjustor 2", . . . , "Phase Adjustor N". Each phase adjustor can adjust the phase of the generated clock prior to the clock being used for sampling in the sub-element. Each sub-clement also has an ISI determination module, respectively labelled in FIG. 1 as "ISI determination module 1", "ISI determination module 2", . . . , "ISI determination module N". The ISI determination module of each sub-element determines an ISI value representing ISI in a sampled signal in that sub-element.

The receiver 102 further includes a timing skew determination module 104, which receives an ISI value from each of the N ISI determination modules, as shown at 105. The timing skew determination module 104 processes the plurality of ISI values to determine whether one or more of the clock phases are to be adjusted. An instruction in the form of a control signal 106 is generated and sent to each of the N phase adjustors to adjust a clock phase of at least one of the plurality of clocks, as necessary, in response to the ISI values.

In operation, an input signal is input into each one of sub-elements 1 to N. FIG. 1 illustrates the same input signal y(t) being input into each sub-element, but more generally this need not be the case. Also, although not shown in FIG. 1, the input signal y(t) may be subject to some sort of pre-processing (e.g. filtering) prior to the sub-elements. In each sub-element, the input signal is processed, and at least some of that processing is such that the input signal itself y(t), or a modified version of the input signal y(t), is sampled using the clock associated with that sub-element. For example, a signal in the sub-element may be sliced by using the clock to sample the signal, with the sampled signal then converted into one of two possible decision values. As another example, a signal may be converted from analog to digital in an analog-to-digital converter (ADC) in the sub-element, where the ADC uses the clock for sampling. In any case, the signal in the sub-element that is sampled using the clock associated with that sub-element is assumed to have some ISI. Even if the signal was previously equalized, it is assumed to still have some residual ISI due to imperfect equalization. The ISI determination module of the sub-element therefore determines a value representing ISI based on the sampled signal in the sub-element (referred to as a "per-phase ISI value"), and the determined ISI value is sent to the timing skew determination module 104. The timing skew determination module 104 receives the ISI value from each of the sub-elements and processes them to determine if there may be clock timing skew. If clock timing skew is identified, then the timing skew determination module sends an instruction to the phase adjustors to adjust the phase of one or more of the clocks based on one or more of the ISI values in order to try to decrease or eliminate the amount of timing skew. In the illustrated embodiments, the operation of sending the ISI values, determining whether there is timing skew based on the values, and adjusting the clock phases (as necessary) occurs on a periodic basis, and typically less often than every symbol period to allow enough time to accumulate sufficient information to determine the updated ISI value.

Figure 3:
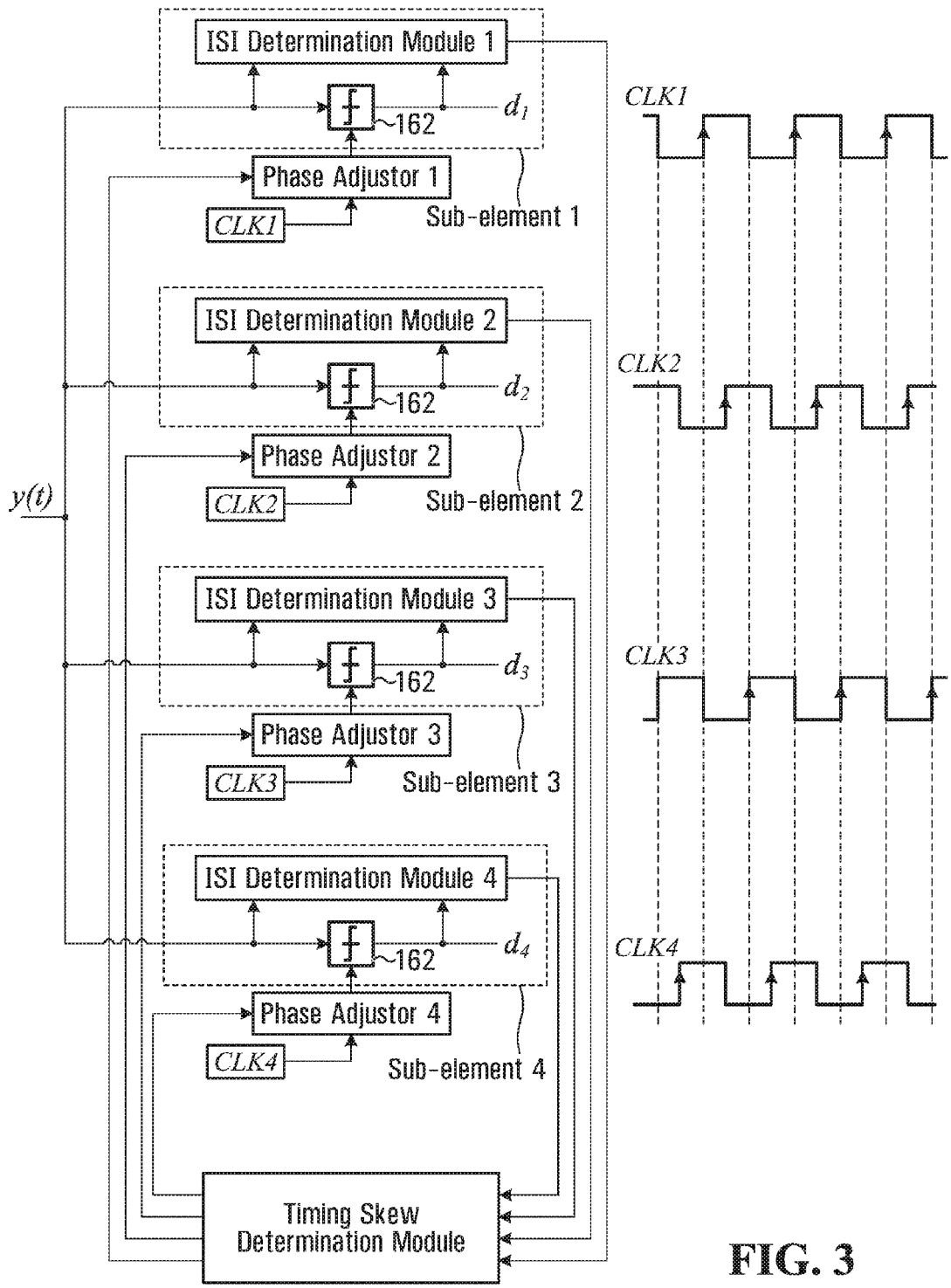
FIG. 3 is a block diagram of the embodiment of FIG. 1 for the case of N=4 and where the sub-elements each comprise a slicer for slicing the input signal.

FIG. 1 illustrates the sub-elements more generally to indicate that the sub-elements are not limited to specific processing circuitry. By way of example, FIG. 3 illustrates the embodiment of FIG. 1 for the case of N=4 and where the sub-elements each comprise a slicer 162 for slicing the input signal y(t). The slicer 162 is a decision circuit that receives the input signal y(t) and converts it to one of two decision values (e.g. +1 or −1) based on the magnitude of the input signal y(t) at the rising edge (sampling point) of the clock driving the slicer 162. CLK 1 to CLK 4 are illustrated on the right hand side of FIG. 3 for the case where there is no timing skew. Each clock has the same frequency, but the clocks have different phases spaced 90 degrees apart. In this embodiment, the signal y(t) is sampled at a frequency that is four times the frequency of each clock, due to the parallel processing of the signal y(t) in the four sub-elements and the 90 degrees phase spacing between the four clocks. In FIG. 3, the ISI determination module is illustrated as receiving both the signal before and after slicing. However, more generally, the ISI determination module may not need both signals to determine an ISI value.

Figure 4:
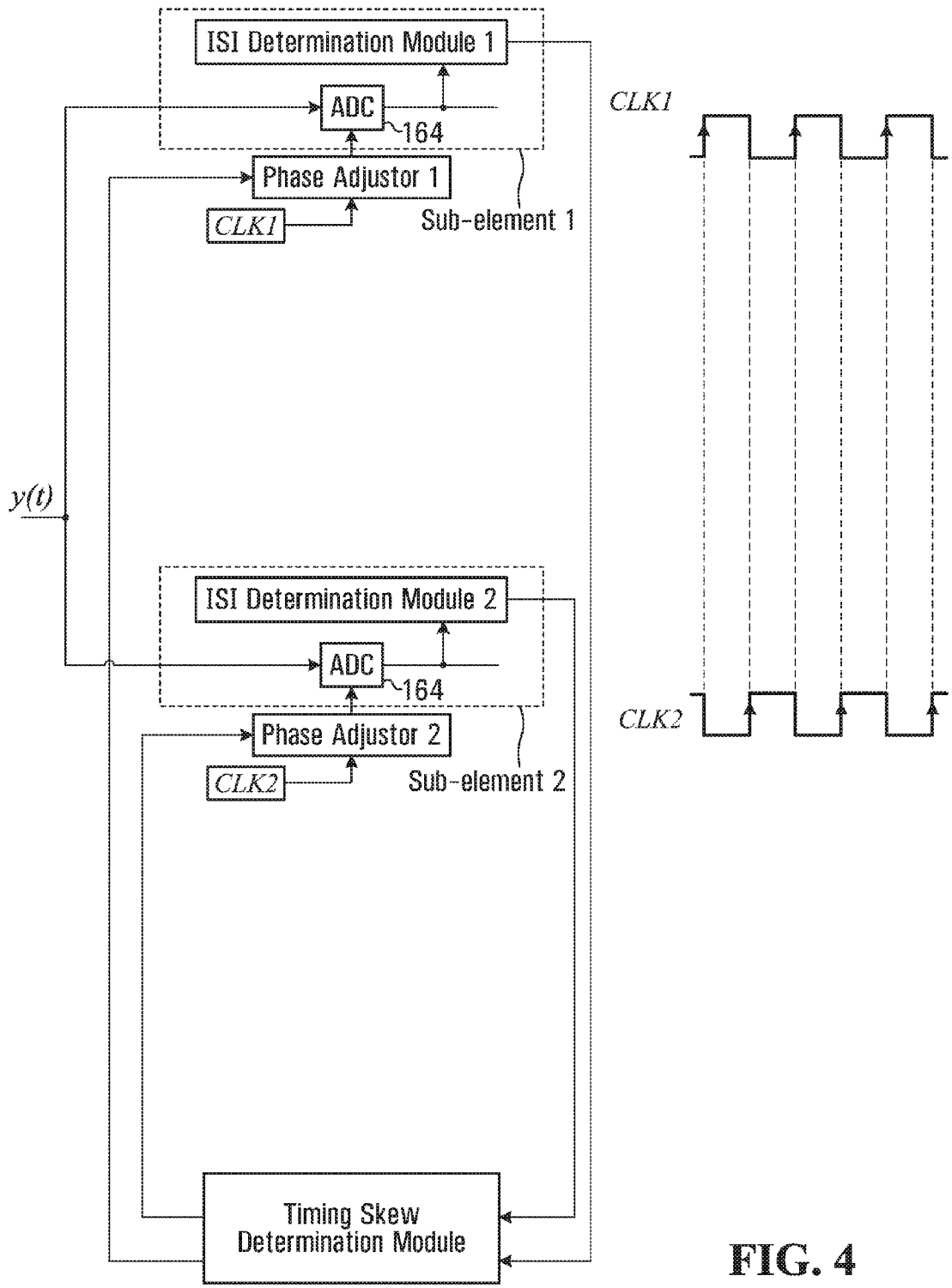
FIG. 4 is a block diagram of the embodiment of FIG. 1 for the case of N=2 and where the sub-elements each comprise an analog-to-digital converter (ADC)

By way of another example, FIG. 4 illustrates the embodiment of FIG. 1 for the case of N=2 and where the sub-elements each comprise an analog-to-digital converter (ADC) 164. The ADC 164 of each sub-element samples the input signal y(t) at the rising edge of the clock associated with that sub-element to determine the digital value corresponding to the analog input. CLK 1 and CLK 2 are illustrated on the right hand side of FIG. 4 for the case where there is no timing skew. Each clock has the same frequency, but the clocks have different phases spaced 180 degrees apart (i.e. CLK 2=$\overline{CLK1}$).

Returning to FIG. 1, the operation of the ISI determination module of each sub-element, as well as the operation of the timing skew determination module 104, will now be described in more detail. When a signal representing a symbol is transmitted through a channel, it is typically subject to ISI (e.g. due to frequency dependent loss or dispersion from the channel). The ISI is interference contributed by the transmission of adjacent symbols (both past and future transmitted symbols in the most general case). As mentioned above, it is assumed that the input signal y(t) in FIG. 1, which came from the channel, includes ISI. If y(t) was pre-processed and subject to some sort of equalization, it is still assumed that y(t) has some residual ISI due to imperfect equalization. For a given received symbol, the total amount of ISI present is a function of the contributed by all previous and future transmitted symbols. The ISI contributed by a particular past or future symbol will be referred to as an "ISI term". Therefore, the total ISI is a function of all of the ISI terms, where each one of the ISI terms represents an amount of ISI contributed by a respective past or future symbol. For a particular symbol period, the ISI determination module determines a value representing the ISI of the signal. The value may be that of one ISI term, a group of ISI terms, or the total of the signal. The ISI value may be measured directly, or the ISI value may represent an indirect or comparative measurement of such as by using a correlation function, as in the specific examples described later.

When a clock is used to sample a signal, as is the case in each of the sub-elements, if the phase of that clock drifts to result in timing skew, then in general the amount of ISI in the signal sampled using the clock will change. To help understand this, please consider the following simple example scenario. Assume that the current symbol is subject to caused by the symbol transmitted immediately prior to the current symbol. If the phase of the clock drifts such that the current symbol is sampled earlier than expected (i.e. sampled closer to the previous symbol), then the ISI contributed by the previous symbol generally increases (since the sampling is closer to the previous symbol value). On the other hand, if the phase of the clock drifts such that the current symbol is sampled later than expected (i.e. sampled farther away from the previous symbol), then the ISI contributed by the previous symbol generally decreases.

If there were no timing skew, then on average over time each sub-element would have the same ISI, assuming the ISI value is determined the some way in each sub-element (e.g. if an ISI value representing one ISI term is computed using one particular technique for one sub-element, then the corresponding ISI value representing the same ISI term is computed using the same technique in the other sub-elements). However, if there is clock timing skew, such that there is a static/average timing deviation of one or more of the clocks from the ideal sampling time, then the ISI of a signal sampled using one clock subject to timing skew will be affected relative to the ISI of the signal sampled using the other clocks. By computing the respective ISI values, one for each clock (i.e. one for each sub-element), and then by comparing these respective ISI values, a determination is made of whether there is (or at least may be) timing skew. At least one of the plurality of ISI values being different from one or more other of the plurality of ISI values is an indication that there is (or at least may be) timing skew. A clock phase of at least one of the clocks can then be adjusted in response to at least one of the plurality of ISI values being different from one or more other of the plurality of ISI values, or being different from a reference ISI value which is based on one or more of the plurality of ISI values. The amount by which to adjust a clock phase of a particular sub-element may be based on the magnitude of the ISI value of that sub-element, or it may be a predetermined increment. The ISI value may also be used to determine the direction in which to move the clock phase.

The ISI measurement module of each sub-element determines the ISI value for the clock associated with that sub-element and sends the ISI value to the timing skew determination module 104. The timing skew determination module 104 processes the plurality of ISI values one from each of the clocks) to determine whether one or more of the clocks need to have their phase adjusted, and if so, the timing skew determination module 104 sends the control signal 106 instructing which phase adjustors to make a phase adjustment and (if appropriate) by how much.

Figure 5:
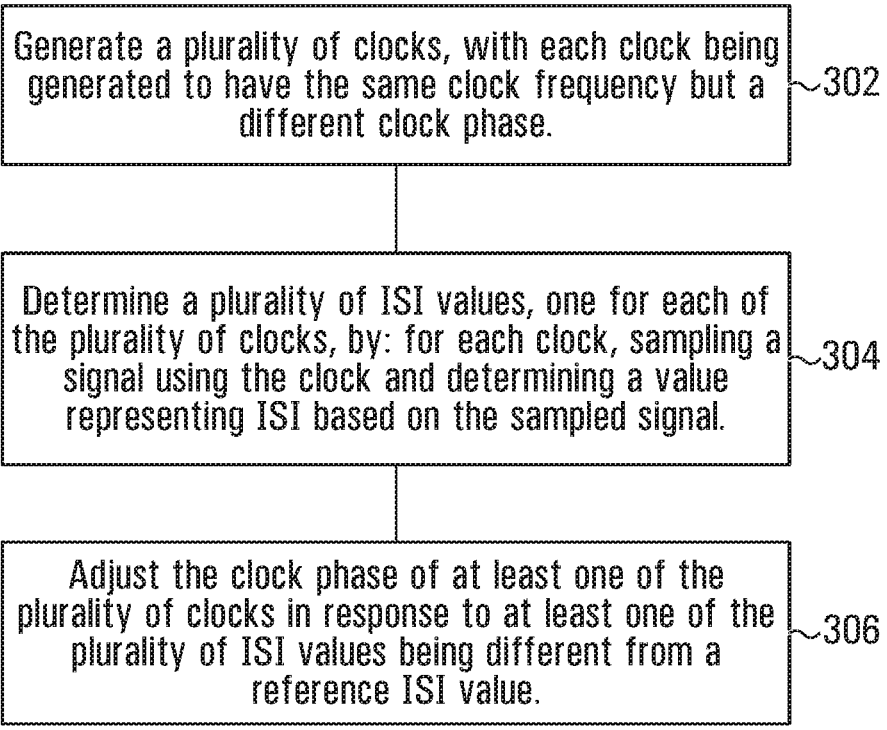
FIG. 5 is a flow chart of one embodiment of a method performed in a interleaved receiver.

Consistent with the above, FIG. 5 is a flow chart of one embodiment of a method performed in time interleaved reciever 102. In step 302, a plurality of clocks are generated (i.e. CLK1, CLK N), where each one of the plurality of clocks is generated to have the same clock frequency but a different clock phase. In step 304, a plurality of ISI values are determined, one for each of the plurality of clocks, by: for each clock of the plurality of clocks, sampling a signal using the clock to obtain a sampled signal and determining a value representing ISI based on the sampled signal. In step 306, the clock phase of at least one of the plurality of clocks is adjusted in response to at least one of the plurality of ISI values being different from a reference ISI value. For example, if an ISI value associated with one of the plurality of clocks is different from the reference ISI value, then that clock and/or another one of the clocks has its phase adjusted.

In some embodiments, the reference ISI value is the average of the plurality of ISI values. In some embodiments, the reference ISI value is the ISI value associated with another one of the clocks. In some embodiments, step 306 comprises the following: a clock phase of one of the plurality of clocks is adjusted in a direction dependent upon whether the ISI value associated with that clock is less than or greater than the reference ISI value (i.e. the direction in which the clock phase is adjusted is dependent upon the polarity or sign of the ISI value compared to the reference ISI value). In some embodiments, step 306 also comprises the following: the amount by which the clock phase of one of the plurality of clocks is adjusted is dependent upon a difference in magnitude between the ISI value associated with the clock and the reference ISI value.

As a simple example, assume that N=4 such that there are 4 clocks, and the ISI value of sub-clement 1 (associated with CLK 1) is "10 mV", the ISI value of sub-element 2 (associated with CLK 2) is "16 mV", the ISI of sub-element 3 (associated with CLK 3) is "8 mV" and the of sub-element 4 (associated with CLK 4) is "6 mV". Assume that the reference ISI value is set as the average of the ISI values. The average of the ISI values is computed by the timing skew determination module 104 as (10+16+8+6)/4=10 mV. The timing skew determination module 104 then determines that there is (or at least may be) timing skew for a particular clock by comparing the ISI value associated with that clock to the reference ISI value ("10 mV"). If there is a difference between the ISI value associated with a clock and the reference ISI value, then it is assumed that the clock has timing skew.

The direction in which the phase of the clock is adjusted is determined by the sign (i.e. polarity) of the difference between the ISI value associated with the clock and the reference ISI value, or in other words, whether the ISI value is greater than or less than the reference ISI value. In the specific embodiments described later, the direction is also based on a priori knowledge of the polarity of the slope on the pulse response (i.e. rising or falling) in the vicinity of the ISI term being measured, as discussed in more detail later. For example, as discussed later, the first pre-cursor ISI term is usually located on a positive slope of the pulse response, whereas the first post-cursor ISI is usually located on a negative slope of the pulse response.

The amount by which to adjust the clock phase is then determined by the magnitude of the difference between the ISI value and the reference ISI value.

In this example, the timing skew determination module 104 does not adjust the phase of CLK 1 since the ISI value associated with CLK 1 is "10 mV", which equals the reference ISI value. However, the ISI value associated with CLK 2 is "16 mV", which is larger than the reference ISI value "10 mV", and so the phase of CLK 2 is adjusted by an amount proportional to the magnitude of the difference (|16−10|=6). The direction in which the phase is adjusted corresponds to the sign of the difference ("+"). Which direction corresponds to which sign is implementation specific and depends upon how the ISI values are computed. For example, if an ISI value represents the ISI term corresponding to the adjacent previous decision symbol, then it may be determined that an ISI value higher than the reference value means a clock that is leading, and so the phase is adjusted to reduce the clock lead. Continuing with the running example, the ISI value associated with CLK 3 is "8 mV", which is smaller than the reference ISI value "10 mV", and so the phase of CLK 3 is adjusted by an amount proportional to the magnitude of the difference (|8−10|=2), and the direction in which the phase is adjusted corresponds to the sign of the difference ("−"). The phase of CLK 3 is adjusted in the opposite direction as the phase of CLK 2, and by a different amount. The same process is performed for CLK 4, which has an associated ISI value "6 mV", which is less than the reference ISI value. The control signal 106 issued by the timing skew determination module 104 indicates which clock phases are to be adjusted and by how much.

As described in the disclosed embodiments, the exact mapping between the ISI value and the timing skew is dependent on the channel (i.e. pulse response) and is not known a priori. Therefore, the skew may instead be corrected one phase step at a time, and then the ISI measured again to determine if more adjustment is needed. Therefore, in some embodiments, the magnitude by which the clock phase is adjusted may be a predetermined increment instead. Making small phase updates (i.e. one step at a time) may also ensure no bit errors are generated during a phase update.

As another simple example, assume that N=2 (i.e. there are only two clocks CLK 1 and CLK 2, each corresponding to a respective sub-element). An average of the two ISI values (one for each clock) could be computed, like in the paragraphs above. However, for the particular case where N=2, the objective is to make the two ISI terms the same. Therefore, alternatively, instead of computing an average ISI value, in this example the ISI value associated with CLK 1 is compared to the ISI value associated with CLK 2. That is, in this example, the ISI value associated with CLK 2 is the reference ISI value. If the ISI value associated with CLK 1 equals the reference ISI value, then no clock phase adjustment is made. However, if the ISI value associated with CLK 1 does not equal the reference ISI value, then the magnitude and sign of the difference between the ISI value associated with CLK 1 and the reference ISI value determines the amount and direction by which the phase of one or both of the clocks is to be moved. As an example, suppose that the ISI value associated with CLK 1 was "10 mV" and the ISI value associated with CLK 2 (the reference ISI value) was "16 mV". The magnitude of the difference is |10−16|=6. The amount CLK 1 and/or CLK 2 is adjusted to reduce the phase discrepancy is proportional to the magnitude of the difference. The sign of the difference (10−16=−6, and therefore "negative"), is an indication of which way to move one or both of the clock phases. Again, the specific direction a clock phase is moved based on the sign of the difference is implementation specific and depends upon how the ISI values are computed.

In the example in the paragraph above, the reference ISI value could instead be the ISI value of CLK 1, or it could instead be an average between the two (10+16)/2=13 mV. After skew correction, the ISI of CLK 1 and ISI of CLK 2 would both report an ISI of 13 mV (equal to each other).

Some example ways in which an ISI determination module can compute an ISI value will now be summarized, with more specific examples provided later. In some embodiments, the ISI value represents one ISI term, and that one ISI term is either directly measured, or instead indirectly measured (e.g. using a correlation function). In some embodiments, the ISI value represents a combination of ISI terms, and the ISI contribution of the combination of ISI terms is either directly or indirectly measured. In some embodiments, the ISI value is computed by: determining a decision value based on the sampled signal; determining an error value that is representative of a discrepancy or difference between the decision value and the signal prior to determining the decision value; and correlating the error value with one or more past and/or future decision values. In one implementation of such an embodiment, the sub-element includes an analog-to-digital converter (ADC) that samples an input signal to convert it to a digitized value representing the magnitude of the signal at the point of sampling. A decision value (e.g. "−1" or "−1") is then determined based on the digitized value. An error value representing the difference between the decision value the digitized value is determined, and a correlation between the error value and one or more past and/or future decision values is performed as part of computing the ISI value. In another implementation, an input signal is sampled/sliced to determine a decision value (e.g. "+1" or "−1"). A copy of the input signal (prior to sampling/slicing) is also sent into another circuit branch in the sub-element, referred to as an "offline" circuit branch path. The input signal in the offline circuit branch path is processed to determine an error value indicating whether the magnitude of the input signal was above or below the decision value. A correlation between the error value and one or more past and/or future decision values is determined as part of computing the ISI value. These operations will be described in more detail below in the context of specific example implementations.

Returning again to FIG. 1, this figure illustrates the sub-elements, phase adjustor, ISI determination modules, and timing skew determination module 104 more generally, as boxes. In actual implementation, they each comprise physical circuitry for performing their functions described herein. Examples of circuitry that may make up a sub-element are illustrated in other figures in relation to specific example implementations (e.g. a sub-element may include an analog-to-digital converter or decision circuitry in the form of a slicer, and/or adding or subtracting circuits for adding or subtracting two signals). The phase adjustors each include circuitry, such as adjustable delay elements, for adjusting the phase of a clock (e.g. by increasing or decreasing delay in the clock path). Note that in FIG. 1 each clock has a phase adjustor associated with it, but more generally, this need not be the case. For example, it could be that one or more of the clocks cannot have their phase adjusted. Each ISI determination module in FIG. 1 includes circuitry for determining an ISI value for a signal in the sub-element. Such circuitry is implementation specific, but may comprise circuitry for performing the example operations of the ISI determination module described herein (e.g. adding and multiplication circuits for performing correlation). Similarly, the timing skew determination module 104 includes circuitry for performing the functions of the timing skew determination module 104. This again is implementation specific, but such circuitry may comprise circuitry for performing the example operations described herein (.g. adding and dividing circuits for determining an average of ISI values and one or more comparators for comparing ISI values).

Some specific example implementations will now be described.

Figure 6:
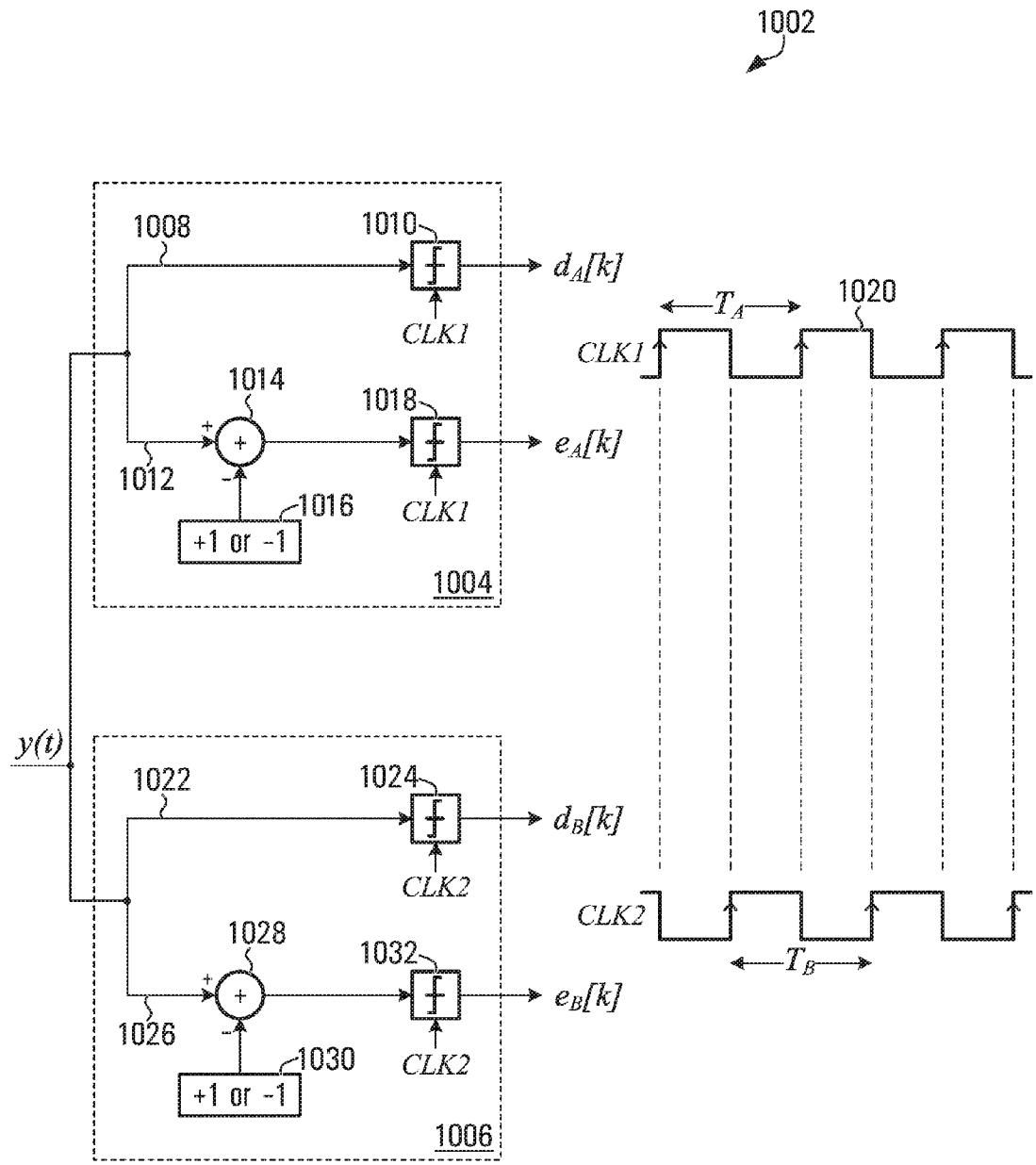
FIG. 6 is a simplified block diagram of one embodiment of a 2-way interleaved receiver.

FIG. 6 is a block diagram of an embodiment of a 2-way interleaved receiver 1002, also commonly called a half-rate receiver. Binary pulse amplitude modulation (binary-PAM) or non-return-to-zero (NRZ) is assumed.

The receiver 1002 includes two receiver portions 1004 and 1006, which will be called sub-elements. Each sub-element corresponds to a respective clock/clock phase. In particular, sub-element 1004 corresponds to a clock 1 ("CLK 1"), and sub-element 1006 corresponds to another clock 2 ("CLK 2"). CLK 1 and CLK 2 are illustrated in FIG. 6 for the situation in which there is no timing skew, such that CLK 1 and CLK 2 are substantially exactly 180 degrees apart in phase. Sub-element 1004 includes two branches or paths: a data path 1008 having a slicer 1010 to determine a decision value $d_A[k]$, and an offline path 1012, which will be called an "error path" 1012. The error path 1012 includes an adjustor 1014 that subtracts a DC offset 1016 from the error path signal, as well as a slicer 1018 downstream, which determines an error value $e_A[k]$.

The offset 1016 subtracted from the error path signal is either "+1" or "−1" and is toggled between these two values during operation of the receiver 1002 in the manner explained below. Note that although "+1" and "−1" are used in the FIG. 6 example (as well as in the FIGS. 10 and 11 examples), it will be understood that more generally they stand for logic levels after equalization in volts. In actual implementation they could be mapped to other voltage levels (e.g. +1/−1 levels could be set to +100 mV/−100 mV).

The slicers 1010 and 1018 are decision circuitry. More specifically, each act to slice their respective input signal to either "+1" or "−1" at each rising edge 1020 (sampling point) of CLK 1, such that the slicer outputs "+1" if the signal being input into the slicer at the sampling point is positive, and such that the slicer outputs "−1" if the signal being input into the slicer at the sampling point is negative. Therefore, during each time period $T_A$ of CLK 1, a decision $d_A[k]$ is output that is either +1 or −1. Similarly, during each time period $T_A$ of CLK 1, an error value $e_A[k]$ is output that is either +1 or −1. However, the offset 1016 causes the error value $e_A[k]$ to effectively be a measurement of whether the magnitude of the signal y(t) in mV) being input into the sub-element 1004 is above or below the selected offset value 1016 (also in mV) at the time of slicing. Therefore, although e[k] is referred to as an "error value", in this and the other illustrated embodiments below, it is more specifically a value indicative of the sign of the error.

Sub-element 1006 of the receiver 1002 is the same as at b-element 1004, except that the slicers are driven by CLK 2 instead. That is, sub-element 1006 includes a data path 1022 having a slicer 1024 to determine a decision value $d_B[k]$, and an offline error path 1026 having an adjustor 1028 for subtracting an offset 1030 from the error path signal, followed by a slicer 1032 for determining an error value $e_B[k]$.

The receiver 1002 may include additional circuitry for processing signal y(t), such as filtering for equalization and/or circuitry for automatic gain control. However, this has been omitted for ease of explanation. A person skilled in the art would readily recognize that FIG. 6 can be modified to incorporate additional circuitry of this nature.

Input signal y(t) has some ISI. As mentioned earlier, for a given received symbol, the ISI contributed by a particular past or future symbol is referred to as an ISI term. In the embodiment described with respect to FIG. 6, it will be assumed that for a signal in a sub-element of the receiver 1002 an ISI term of that signal is measured indirectly by using a correlation between the error value e[k] of the sub-element (e.g. $e_A[k]$ in the case of sub-element 1004) and the decision value corresponding to that ISI term. As a convention it is assumed that the error value e[k] originates from $e_A[k]$ when k is odd, and originates from $e_B[k]$ when k is even. Similarly, it is assumed that the decision value d[k] originates from $d_A[k]$ when k is odd, and originates from $d_B[k]$ when k is even.

During operation of the receiver 1002, in sub-element 1004 the offset 1016 is first selected to be one of the two values. Assume for the sake of example that it is first chosen as "+1.". During each clock CLK 1 period, the decision $d_A[k]$ will either equal the offset 1016 or not equal the offset 1016 (since the decision $d_A[k]$ will either be +1 or −1). When $d_A[k]=-1$ (i.e. when the decision value does not equal the offset 1016), the error value $e_A[k]$ is ignored. However, when $d_A[k]=+1$ (i.e. when the decision value $d_A[k]$ does equal the offset 1016), then the value of $e_A[k]$ wilt be indicative of whether the magnitude of the signal y(t) at the slicing point was above −1 or below +1. Specifically, $e_A[k]=+1$ indicates that the magnitude of the signal y(t) at the slicing point was above −1, and $e_A[k]=-1$ indicates that the magnitude of the signal y(t) at the slicing point was below +1.

Each time the error value e[k] is not erroneous (i.e. when the decision value $d_A[k]$ equals the offset value), the error value e[k] is correlated with at least one adjacent decision value. In this embodiment it will be assumed that the error value e[k] is correlated with the previous decision value d[k−1], and the correlation value e[k]d[k−1] is computed. Over time, that is for each symbol period, a running summation of the correlation value is computed for CLK 1: $C_A^{j+1}=C_A^j+\mu e[k]d[k-1]$, for odd values of k, where it is a correlation scaling factor and the value j represents the iteration of the update. This is referred to as computing the correlation using the sign-sign least mean square (SS-LMS) method, and it provides a relative measurement of ISI (which is an example of an indirect ISI value). Similarly the correlation value is computed for CLK 2: $C_B^{j+1}=C_B^j+\mu e[k]d[k-1]$, for even values of k.

The offset 1016 is toggled during operation. Therefore, after a predetermined period of time has elapsed, the offset 1016 is changed from "+1" to "−1". In this case, the error value is then only used when d[k]=−1 (i.e. when the decision value d[k] equals the offset 1016), and in such a case e[k] will indicate whether the magnitude of the signal y(t) at the slicing point is above −1 or below −1. Each time the error value e[k] is not erroneous the correlation with the previous decision value is computed (e[k]d[k−1]), and this added to the running $C_k^{j+1}=C_A^j+\mu e[k]d[k-1]$ for odd values of k and $C_B^{j+1}=C_B^j+\mu e[k]d[k-1]$ for even values of k.

If there was no input signal y(t), then there would be no correlation of the error value with the previous decision value. That is, e[k]d[k−1] would be either +1 or −1 each clock period with equal probability, such that over time $C_A=\Sigma e[k]d[k-1]$ updated for odd values of k and $C_B=\Sigma e[k]d[k-1.]$ updated for even values of k should tend towards zero. However, there is ISI in the input signal y(t), and so there is some correlation with the previous decision symbol, such that $C_A/C_B$ are non-zero. In particular, due to the ISI, the previous decision signal level has an influence on the magnitude of the current decision level. As an example, considering a bandwidth limited case (where the first post-cursor ISI term has the same polarity as the cursor), if the previous decision was "−1" and the current bit is "+1", then the signal magnitude y(t) during the current bit may be diminished (i.e. still closer to −1) due to the effect of the previous −1. This will more likely cause the signal magnitude y(t) during the current bit to be less than the offset 1016/1030 of +1, and hence the error signal more likely be e[k]=1, such that e[k]d[k−1]=(−1)(−1)=1. That is, the correlation with the previous decision will settle to a positive value.

Therefore, the correlation value associated with CLK 1 is: $C_A=\Sigma_k \mu e[k]d[k-1]$ for odd values of k, where e[k]d[k−1] is replaced with zero when the actual decision value does not equal the chosen offset, and the correlation value for CLK 2 is sub-element 1006 is: $C_B=\Sigma_k \mu e[k]d[k-1]$ for even values of k, where e[k]d[k−1] is replaced with zero when the actual decision value does not equal to the chosen offset.

The digital accumulators used to hold the values of $C_A$ and $C_B$ must be large enough to not saturate. The correlation running total may need to be periodically reset to prevent overflow/saturation of the integrator. For example, the running total may be reset after each ISI measurement. The ISI measurement/accumulation period should be chosen long enough to provide sufficiently accurate ISI measurements while not be too long to avoid saturating the integrators.

The value of $C_A$ is proportional to the magnitude of the contributed by the previous decision value d[k−1] seen at the rising edge of CLK 1, and the sign (polarity) of $C_A$ is proportional to the sign of the ISI. Similarly, the value of $C_B$ is proportional to the magnitude of the contributed by the previous decision value d[k−1] seen at the rising edge of CLK 2, and the sign (polarity) of $C_B$ is proportional to the sign of the ISI.

If there is no timing skew between CLK 1 and CLK 2, then $C_A$ and $C_B$ should converge to the same value (within a tolerance, as the correlation is computed over a finite period of time and the signal y(t) may be corrupted by noise, and so the two values could be slightly different). However, if there is timing skew such that CLK 1 leads CLK 2, then CLK 1 is sampling closer to the previous decision value compared to CLK 2, so the correlation value $C_A$ will be higher than $C_B$. On the other hand, if there is timing skew such that CLK 1 lags CLK 2, then CLK 1 is sampling farther from the previous decision value compared to CLK 2, so the correlation value $C_A$ will be lower than $C_B$. This means that the sign of the difference between the two correlation values $C_A$ and $C_B$ indicates which way to adjust the phase of CLK 1 and/or CLK 2, and the magnitude of the difference between the two correlation values $C_A$ and $C_B$ indicates by how much to adjust the phase of CLK 1 and/or CLK 2.

Figure 7:
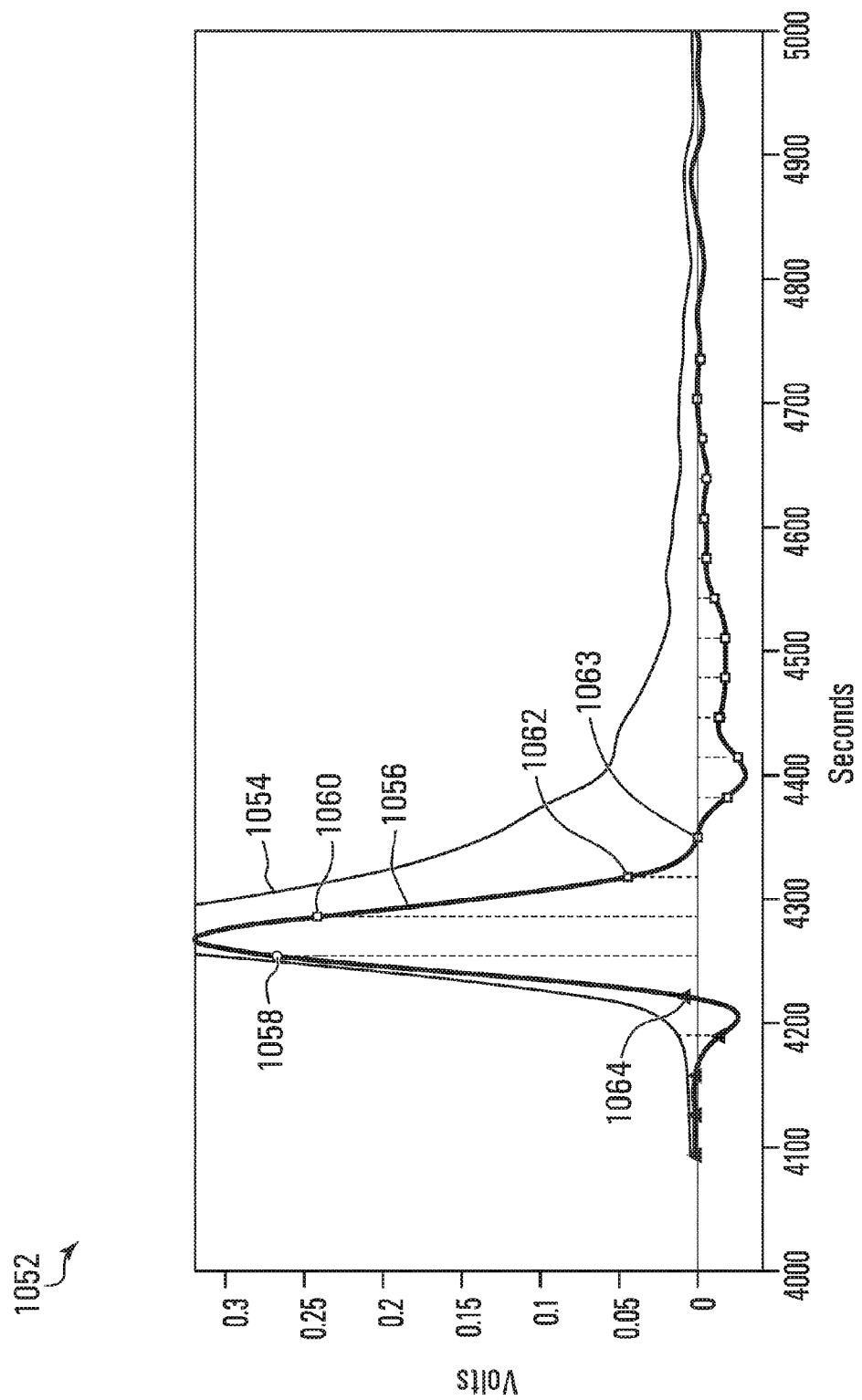
FIG. 7 is a plot of an example pulse response.

To help better understand this, please consider FIG. 7, which illustrates a plot of an example pulse response 1052 showing pre and post cursor ISI term. It is assumed that some equalization is performed, such that an initial response is shown at 1054, followed by an equalized response 1056 having some residual ISI. Following convention, the "cursor" will refer to the current decision value d[k], the "$n^{th}$ post-cursor" will refer to the $n^{th}$ previous decision value (e.g. the "$1^{st}$ post-cursor" refers to the adjacent previous decision value d[k−1]), and the "$n^{th}$ pre-cursor" will refer to the $n^{th}$ future decision value (e.g. the "$1^{st}$ pre-cursor" refers to the adjacent future decision value d[k+1]). The cursor is shown at 1058 and represents the correlation of the current decision with itself. The first post-cursor ISI is shown at 1060 and represents the ISI contributed by the adjacent previous decision value d[k−1]. The second post-cursor ISI is shown at 1062 and represents the ISI contributed by the decision value two symbol periods ago d[k−2]. The third post-cursor ISI is shown at 1063 and represents the ISI contributed by the decision value three symbol periods ago d[k−3]. The other post-cursor values are each respectively illustrated by a square on the right-hand side of the plot.

The first pre-cursor ISI is shown at 1064 and represents the ISI contributed by the adjacent next decision value d[k+1]. The other pre-cursor values are each respectively illustrated by a triangle on the left-hand side of the plot.

The equalized response 1056 provides an indication of the relative amount of ISI contributed by each past and future decision value. As can be seen from 1060, in this example plot the adjacent previous decision value d[k−1] contributes the most amount of ISI. That is, the current decision value is most correlated to the adjacent previous decision value compared to any other previous or future decision value.

Figure 8:
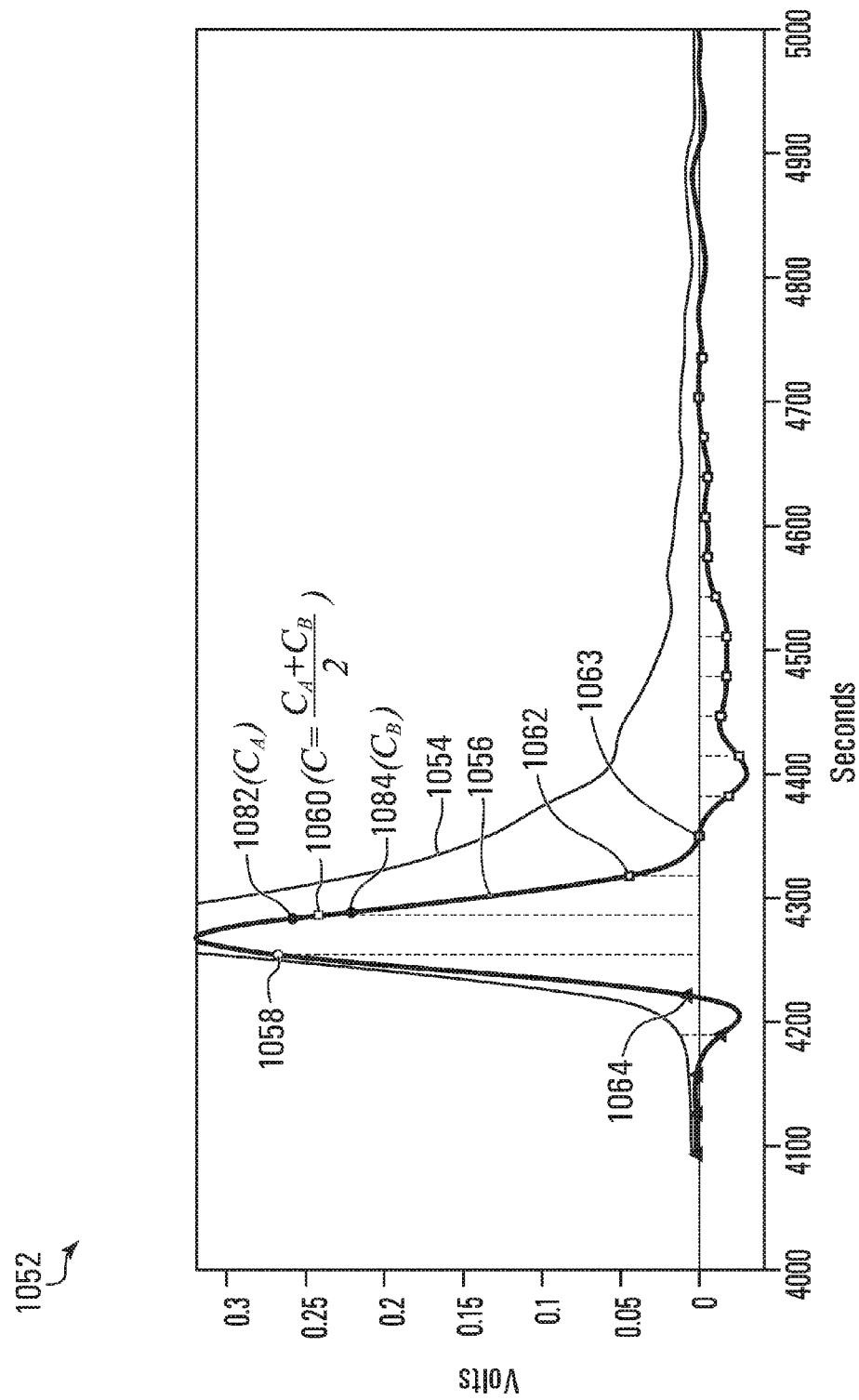
FIGS. 8 and 9 are the plot of FIG. 7, but showing additional correlation values.
Figure 9:
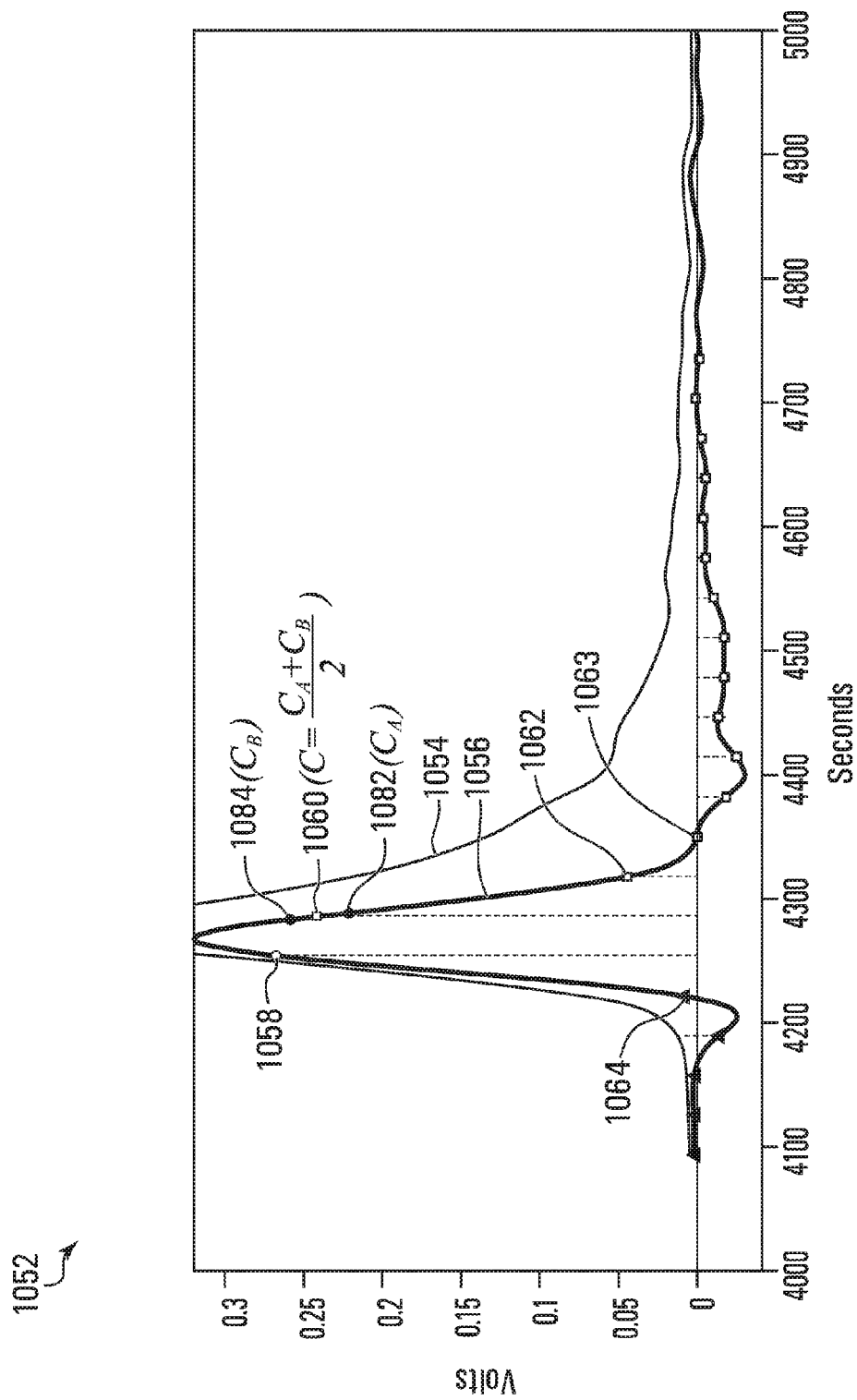

The timing skew between CLK 1 and CLK 2 is detected by measuring the difference in first post-cursor ISI between sub-elements 1004 and 1006, i.e. the difference between $C_A$ and $C_B$. If there is no timing skew between CLK 1 and CLK 2, then the two correlation values $C_A$ and $C_B$ will equal each other, i.e., $C_A=C_B=C$. The average of the two $(C_A+C_B)/2$ will then also be C, which corresponds to 1060 in FIG. 7. However, if CLK 1 leads CLK 2, then the first post-cursor ISI for sub-element 1004 (CLK 1) will be greater than the first post-cursor ISI for sub-clement 1006 (CLK 2), that is, correlation value $C_A$ will be greater than correlation value $C_B$. This is shown in FIG. 8, which is the plot of FIG. 7, but with the correlation value $C_A$ for the first sub-element 1004 shown at 1082, and the correlation value $C_B$ for the second sub-element 1006 shown at 1084. The average of the two $(C=(C_A+C_B)/2)$ is between $C_A$ and $C_B$. On the other hand, if CLK 1 lags CLK 2, then the first post-cursor ISI for sub-element 1004 will be less than the first post-cursor ISI for sub-element 1006, that is, correlation value $C_A$ will be smaller than correlation value $C_B$, with the average between the two. This is shown in FIG. 9.

Returning to FIG. 6, it will be noted that this figure is simplified in that the circuitry for implementing the ISI determination module of sub-elements 1004 and 1006 is not illustrated. The ISI determination module of sub-element 1004 would include the circuitry to compute the correlation value $C_A$ (i.e. an accumulator to hold the running value of $C_A$, as well as adding and multiplying circuits). The ISI determination module of sub-element 1006 would be substantially identical, but with the error and decision values of sub-element 1006 being used instead as inputs to result in the computation of the value $C_B$. The timing skew detection module (i.e. item 104 in FIG. 1) is also not illustrated in FIG. 6. However, in one embodiment, it would receive $C_A$ and $C_B$, choose one (e.g. $C_B$) as the reference ISI value, compare the other one the reference ISI value (i.e. compare $C_A$ and $C_B$), and generate an instruction to adjust the phase of CLK 1 and/or CLK 2 in a direction determined by the polarity/sign of the difference, and by an amount depending on the magnitude of the difference. In another embodiment, it would choose the average of $C_A$ and $C_B$ as the reference value. The circuitry of the timing skew detection module would include the circuitry for performing these operations. Also, for simplicity, the phase adjustors for adjusting the phase of CLK 1 and CLK 2 are not illustrated in FIG. 6.

In the example method for detecting timing skew discussed above in relation to FIG. 6, only the first post-cursor ISI term is used to determine whether there is timing skew. That is, a correlation value associated with each of CLK 1 and CLK 2 is computed, and the sign and the magnitude of the difference between such correlation values is a measurement of the timing skew, but the correlation values are only based on correlation with the first post-cursor ISI term: e[k]d[k−1]. More generally, other pre and/or post cursor terms can be used in the correlation operation. As another example, the error e[k] of each sub-element may be correlated with the first pre-cursor ISI term instead (e[k]d[k+1]) or with a combination of both the first post-cursor and first pre-cursor ISI terms: e[k](d[k−1]+d[k+1]). In any case, the method typically works better if the ISI terms used are located on a sufficiently steep part of the response so that a difference in timing skew between CLK 1 and CLK 2 translates into a meaningful difference in correlation values (i.e. a meaningful difference between the per-phase ISI values of CLK 1 and CLK 2 and any reference ISI value). Such is the case for the first post-cursor in the pulse response shown in FIGS. 7 to 9, where the first post-cursor value 1060 is on a steep declining portion of the response 1052. However, if say the third post-cursor 1063 was used instead (e[k]d[k−3]) in the particular response shown in FIGS. 7 to 9, then timing skew between CLK 1 and CLK 2 would translate into a less meaningful difference between correlation values $C_A=\Sigma\mu e[k]d[k-3]$ updated for odd values of k and $C_B=\Sigma\mu e[k]d[k-3]$ updated for even values of k, as the third post-cursor ISI term 1063 corresponds to a less steep part of the curve of the response 1056. Intuitively this also makes sense: if the decision three symbols ago does not impact the value of the current symbol very much, then whether sampling of the current symbol occurs a little earlier or a little later than ideal due to timing skew, the correlation with the decision three symbols ago will likely not change very much.

It will also be clear from FIG. 7 that if the ISI term used for the correlation is a pre-cursor ISI on the rising portion of the pulse response (as at 1064 for example), then a CLK 1 that leads CLK 2 will correspond to a smaller correlation value $C_A$ compared to correlation value $C_B$, and a CLK 1 that lags CLK 2 will correspond to a larger correlation value $C_A$ compared to correlation value $C_B$. In short, whether $C_A<C_B$ means CLK 1 is leading or lagging CLK 2 depends on the sign of the slope of the pulse response where the ISI is measured. If the slope is positive, as it usually is for the case of non-zero pre-cursor ISI, then per phase measured ISI will be lower if the clock phase leads the average clock phase and higher if the clock phase lags the average clock phase. On the other hand, if the slope is negative, as it usually is for the case of first post cursor ISI from an under equalized channel, then the per phase measured ISI will be higher if the clock phase leads the average clock phase and lower if the clock phase lags the average clock phase. This is why it is implementation specific as to which direction to adjust the phase of the clock given a particular difference in polarity/sign between the ISI value associated with the clock (the "per-phase" ISI value) and the reference ISI value.

In the example of FIG. 6, it is not necessary to compute the average of the plurality of values (i.e. the average of $C_A$ and $C_B$), as there are only two clocks. For N clocks, the average of the plurality of ISI values may be computed by updating the SS-LMS equation ($C=\Sigma\mu e[k]d[k-1]$) across all clock phases (i.e. all of the N clocks), that is, by summing the per phase correlation values and dividing by N.

Figure 10:
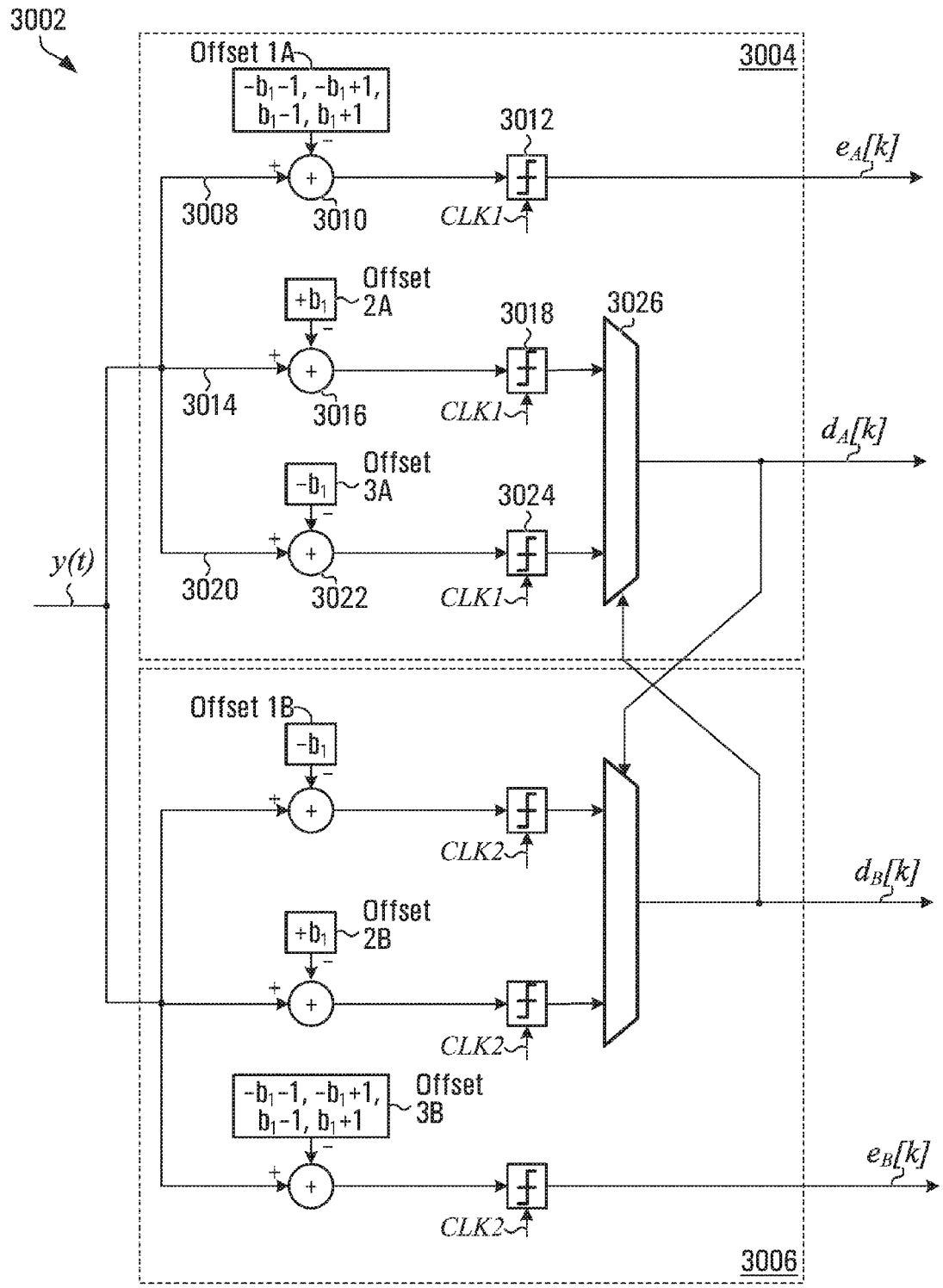
FIG. 10 is a simplified block diagram of another embodiment of a 2-way interleaved receiver.

In some embodiments, the receiver may be a SerDes (serializer/deserializer) receiver that includes an adaptive continuous-time-linear-equalizer (CTLE) and/or a decision feedback equalizer (DFE). The DFE may be implemented using direct feedback and/or using look-ahead/loop unrolling. As an example, the receiver may incorporate a DFE in which the offline error path used for updating the tap(s) of the DFE is also used for adjusting the timing skew. For example, FIG. 10 is a block diagram of one embodiment a 2-way interleaved (half rate) receiver 3002 incorporating a one-tap "look ahead" DFE. The receiver 3002 again has two sub-elements (since it is a half rate receiver), these being labelled 3004 and 3006. Each sub-element corresponds to a respective clock phase. In particular, sub-element 3004 corresponds to a first clock ("CLK 1"), and sub-element 3006 corresponds to a second clock ("CLK 2"). Sub-element 3004 includes three branches: an offline error branch 3008 including an adjustor 3010 for subtracting an offset "Offset1A" from the branch signal, followed by a slicer 3012; a first data path branch 3014 including an adjustor 3016 for subtracting an offset "Offset2A" from the branch signal, followed by a slicer 3018; and a second data path branch 3020 including circuitry 3022 for subtracting an offset "Offset3A" from the branch signal, followed by a slicer 3024. There are two data path branches because the first data path branch 3014 assumes that the previous decision value is equal to +1, which means an equalizing value of $b_1$ (and hence the value of "Offset2A"=$b_1$), and the second data path branch 3020 assumes that the previous decision value is equal to −1, which means an equalizing value of (and hence the value of "Offset3A"=−$b_1$) A multiplexer 3026 selects which one of the first data path branch 3014 and the second data path branch 3020 is output as the decision value based on what the actual previous decision value is, once determined. This can be determined from the decision of the adjacent previous CLK 2 decision output, which was sampled one symbol period ago.

The "Offset1A" of the error path 3008 takes on one of four possible values, each one corresponding to a possible combination of +/−1 and +/−$b_1$. These four possible values are: −$b_1$−1, −$b_1$+1, $b_1$−1, $b_1$+1.

During operation, the "Offset1A" is toggled between one of its four possible values. When the selected Offset1A matches the actual decision value (+1 or −1) and the actual correct tap to use based on the actual previous decision value (+$b_1$ or −$b_1$), then the error value is used for computing the updated $b_1$ and is also used for computing the next iteration of the sub-element 3004 (CLK 1) correlation value $C_A$.

Sub-element 3006 of receiver 3002 has the same configuration and operation as sub-element 3004.

In the same way as described above with respect to FIG. 6, to determine the timing skew between CLK 1 and CLK 2, the correlation value $C_A$ of sub-element 3004 is compared to the correlation value $C_B$ of sub-element 3006. The sign of the difference between $C_A$ and $C_B$ determines whether CLK 1 leads or lags CLK 2, and the magnitude of the difference between $C_A$ and $C_B$ determines by how much lead or lag there is, and hence how much the phase of CLK 1 and/or CLK 2 should be adjusted. Again, the actual circuitry for computing the ISI values (i.e. for computing correlation values $C_A$ and $C_B$) and for determining whether there is timing skew and instructing a phase shift is not illustrated in FIG. 10.

Figure 11:
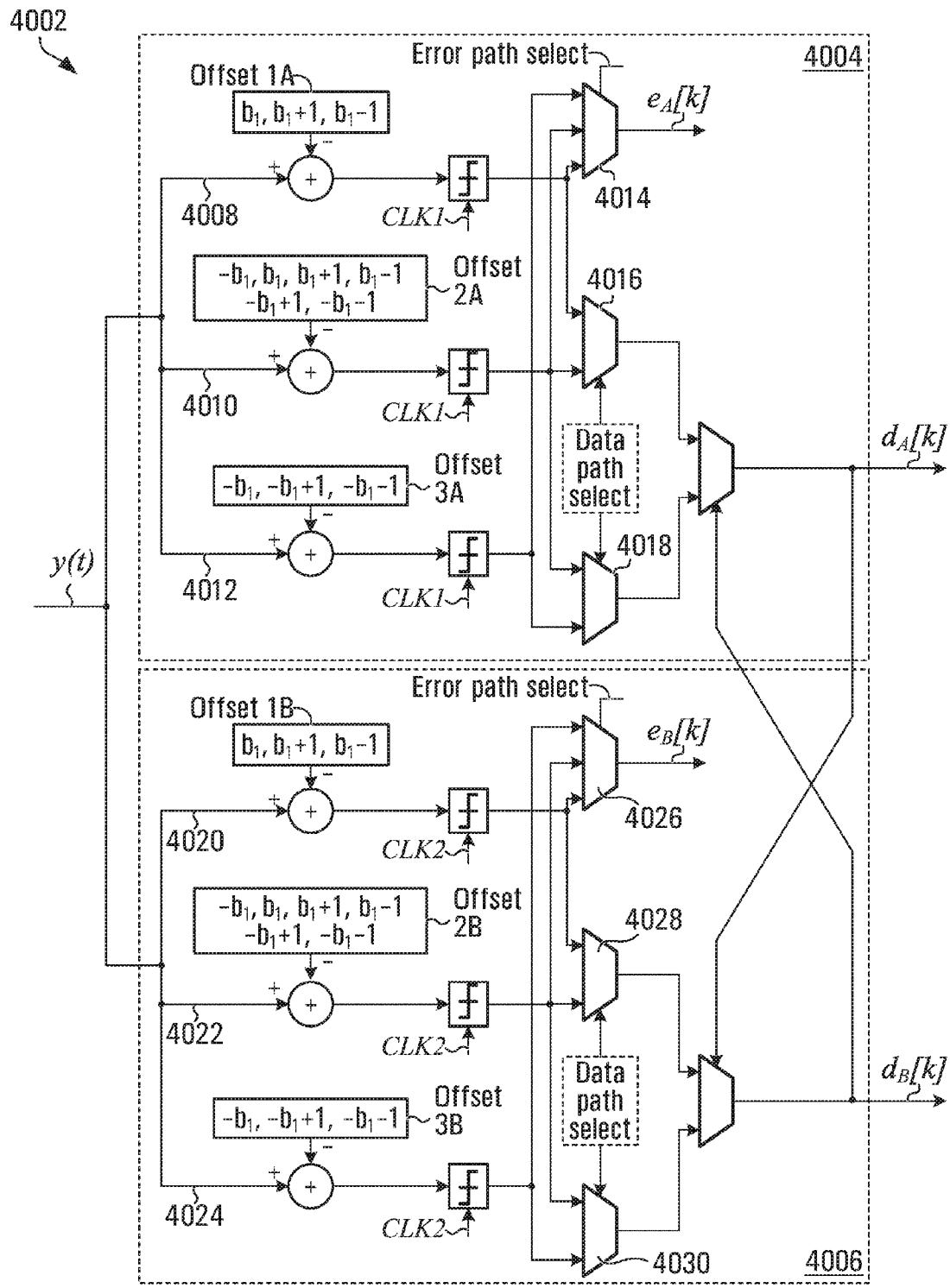
FIG. 11 is a simplified block diagram of another embodiment of a 2-way interleaved receiver.

FIG. 11 is a block diagram of another embodiment of a 2-way interleaved (half-rate) receiver 4002 based on FIG. 7 of U.S. patent application Ser. No. 14/806,346, filed on Jul. 22, 2015, and which is hereby incorporated by reference. The half-rate receiver 4002 incorporates a one-tap "look ahead" DFE and again has two sub-elements 4004 and 4006 (one corresponding to CLK 1 and another corresponding to CLK 2). Like in FIG. 10, sub-element 4004 has three branches 4008, 4010, and 4012, each having a respective adjustor to subtract an offset followed by a slicer. However, instead of sub-element 4004 having a fixed offline error path (as in 3008 of FIG. 10), the error path is toggled between branches 4008, 4010, and 4012. A multiplexer 4014 selects which of the three branches 4008, 4010, or 4012 is selected as the offline error path. Multiplexers 4016 and 4018 then select the other two remaining branches as the data paths. Similarly, sub-element 4006 has three branches 4020, 4022, and 4024, and multiplexers 4026, 4028, and 4030.

During operation, branches 4008 and 4020 are first selected as the offline error branches, and respective correlation values $C_{1A}$ and $C_{1B}$ are computed in the manner discussed above when the error value is not erroneous (e.g. a running correlation value based on the first post-cursor ISI: $C_{1A}^{j+1}=C_{1A}^{j}+\mu e[k]d[k-1]$ for odd values of k and $C_{1B}^{j+1}=C_{1B}^{j}+\mu e[k]d[k-1]$ for even values of k, where the next iteration j+1. only occurs when the error value is not erroneous). Then, branches 4010 and 4022 are selected as the offline error branches, and respective correlation values $C_{2A}$ and $C_{2B}$ computed in the same manner. Then, branches 4012 and 4024 are selected as the offline error branches, and respective correlation values $C_{3A}$ and $C_{3B}$ computed. This may be repeated. The correlation value $C_A$ corresponding to CLK 1 (sub-element 4004) may then be computed as the sum of $C_{1A}$, $C_{2A}$, and $C_{3A}$: $C_A=C_{1A}+C_{2A}+C_{3A}$. Similarly, the correlation value $C_B$ corresponding to CLK 2 (sub-element 4006) may then be computed as the sum of $C_{1B}$, $C_{2B}$, and $C_{3B}$: $C_B=C_{1B}+C_{2B}+C_{3B}$. In the same way as described above, to determine the timing skew between CLK 1 and CLK 2, the correlation value $C_A$ of sub-element 3004 is compared to the correlation value $C_B$ of sub-element 3006. The sign of the difference between $C_A$ and $C_B$ determines whether CLK 1 leads or lags CLK 2, and the magnitude of the difference between $C_A$ and $C_B$ determines by how much lead or lag there is, and hence how much the phase of CLK and/or CLK 2 should be adjusted.

In each case during operation of the receiver 4002, when the error value for a sub-element is not erroneous, the taps may also be updated.

A selection of Offset1A, Offset2A, and Offset3A for each possible selected error path and error value is outlined in the following table for sub-elements 4004 and 4006:

| Selection | Selected Error Path 4014/4026 | Offset1A Value | Offset2A Value | Offset3A Value | e[k] used to update correlation value and update taps? |
|---|---|---|---|---|---|
| 1 | PATH 4008/4020 | $b_1 + 1$ | $b_1$ | $-b_1$ | Only when it is determined that d[k − 1] = 1 and d[k] = 1 |
| 2 | PATH 4008/4020 | $b_1 - 1$ | $b_1$ | $-b_1$ | Only when it is determined that d[k − 1] = 1 and d[k] = −1 |
| 3 | PATH 4010/4022 | $b_1$ | $-b_1 + 1$ | $-b_1$ | Only when it is determined that d[k − 1] = −1 and d[k] = 1 |
| 4 | PATH 4010/4022 | $b_1$ | $-b_1 - 1$ | $-b_1$ | Only when it is determined that d[k − 1] = −1 and d[k] = −1 |
| 5 | PATH 4012/4024 | $b_1$ | $-b_1$ | $-b_1 + 1$ | Only when it is determined that d[k − 1] = −1 and d[k] = 1 |
| 6 | PATH 4012/4024 | $b_1$ | $-b_1$ | $-b_1 - 1$ | Only when it is determined that d[k − 1] = −1 and d[k] = −1 |
| 7 | PATH 4010/4022 | $b_1$ | $b_1 + 1$ | $-b_1$ | Only when it is determined that d[k − 1] = 1 and d[k] = 1 |

| Selection | Selected Error Path 4014/4026 | Offset1A Value | Offset2A Value | Offset3A Value | e[k] used to update correlation value and update taps? |
|---|---|---|---|---|---|
| 8 | PATH 4010/ 4022 | $b_1$ | $b_1 - 1$ | $-b_1$ | Only when it is determined that $d[k-1] = 1$ and $d[k] = -1$ |

Comparison circuitry (not shown) is used to perform the comparison in the right-most column in the table above to determine whether the error value is erroneous.

A possible benefit of the FIG. 11 implementation is that the measurement (via the correlation values $C_A$ and $C_B$) incorporates any additional timing skew mismatch introduced by the individual slicers. For example, if the slicer in branch 4008 introduced some additional timing skew mismatch to CLK 1, and the slicer in branch 4010 introduced a different amount of additional timing skew mismatch to CLK 1 (due to the fact that every slicer is not exactly the same due to the tolerance of the manufacturing process), and the slicer in branch 4012 introduced yet a different amount of additional timing skew mismatch to CLK 1, then the correlation value $C_A$ would reflect this, as $C_A$ is made up of all branch correlation values, rather than just a fixed offline error path (like offline error path 3008 in FIG. 10).

In the FIG. 11 embodiment, the timing skew between different branches on the same clock phase may also be adjusted, although this would require additional phase adjustors (not illustrated), and a second analogous function for adjusting this "differential" phase offset for each set of branches adjusted to a clock phase. The method described above may be used to control the "common" phase adjustment, and then the same method may be repeated on a per-clock-phase basis, where the correlations would be used to adjust the per-sampler phase adjusters in an analogous manner.

Although the foregoing has been described with reference to cur certain specific embodiments, various modifications thereof will be apparent to those skilled in the art without departing from the scope of the claims appended hereto.

For example, in the FIGS. 10 and 11 embodiments described above, each branch has its own adjustor. However, more generally, the adjustors can be common/shared within or by the sub-elements. This would use less hardware.

As another example, in the embodiments explained above with respect to FIGS. 6 to 11, the ISI is measured indirectly using a correlation of the error value e[k] with one or more past and/or future decision values. However, this is only one example way to compute the ISI As another example, the ISI contributed by a given past or future decision value may be directly computed. In either case, the end result of comparing the ISI value associated with CLK 1 to the ISI value associated with CLK 2 and appropriately adjusting the phase of CLK 1 and/or CLK 2 is the same whether the ISI is measured directly or whether it is measured indirectly. The difference is in the implementation of how an ISI values are determined.

As another example, in a "look ahead" receiver, such as in the embodiments described above in relation to FIGS. 10 and 11, per look-ahead path clock timing skew adjustment may be performed. This may provide more optimal skew correction, as the corrected skew would not be an "average" of the skew seen by all the slicers/samplers within a sub-element, but instead a per slicer/sampler skew. Additional qualification of the error signal would be required based on the previous decision for a single look-ahead DFE implementation, or the first two previous decisions for dual look-ahead tap DFE implementation, so that only error values are used that are not erroneous. A drawback of such an implementation is the provision of additional skew adjustment circuits to allow per slicer/sampler skew correction.

Figure 12:
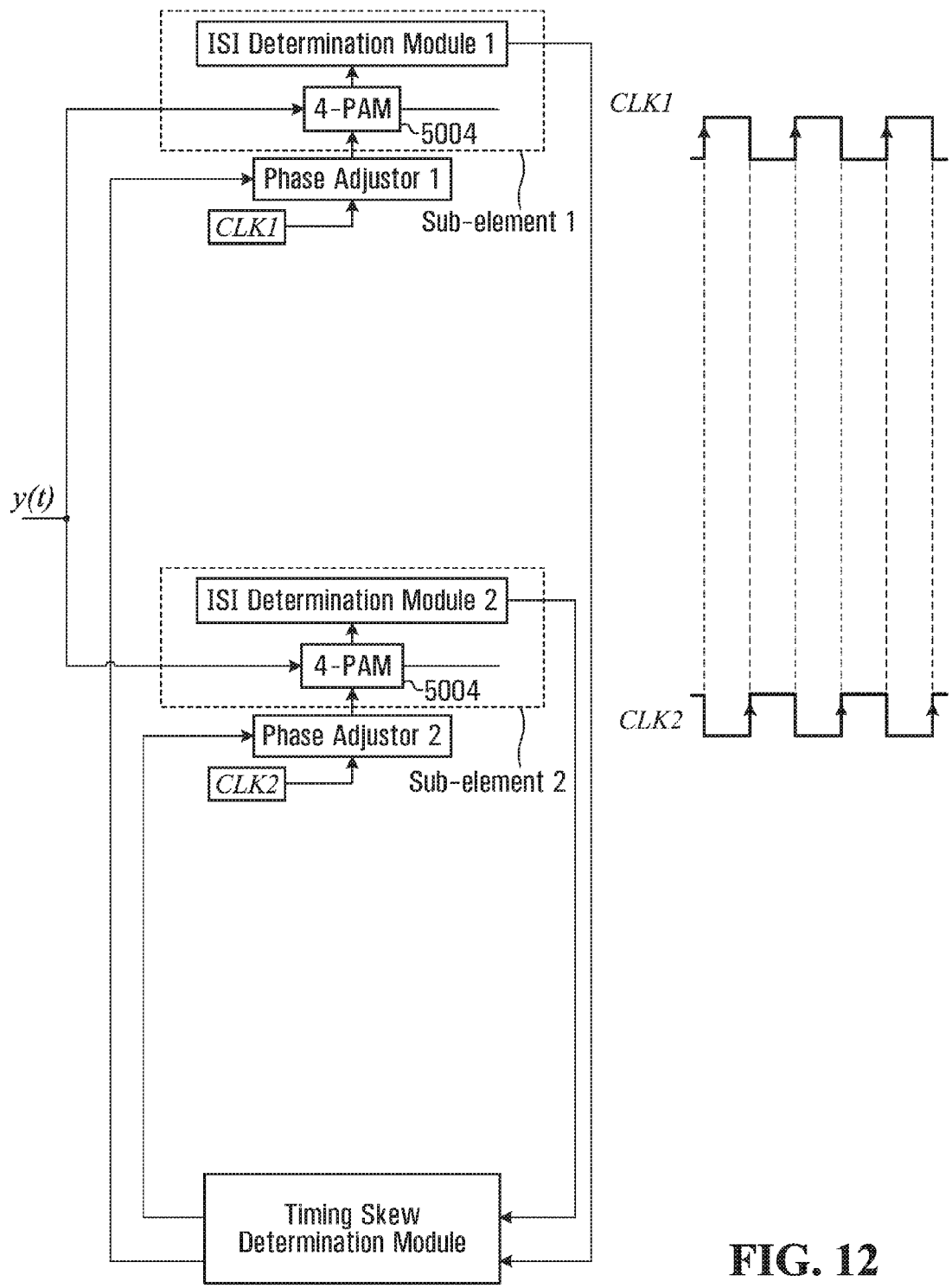
FIG. 12 is a simplified block diagram of a 2-way interleaved receiver that implements 4-PAM detection.

As a final example, the embodiments explained above in relation to FIGS. 6 to 11 are specific to binary PAM or NRZ. However, more generally, the method for determining and addressing clock timing skew described above is also applicable to M-PAM (M>2) and could be extended to the M-PAM case in a manner understood by those skilled in the art. For example, FIG. 12 is a simplified block diagram of a 2-way interleaved receiver that implements 4-PAM detection. Specifically, each sub-element comprises a 4-PAM detector 5004. CLK 1 and CLK 2 are illustrated on the right hand side of FIG. 12 for the case where there is no timing skew. Each clock has the same frequency, but the clocks have different phases spaced 180 degrees apart (i.e. CLK 2= $\overline{\text{CLK1}}$). An value is determined in each sub-element based on the signal as sampled in the 4-PAM detector of that sub-element. The timing skew determination module receives the ISI values and adjusts the phase of CLK 1 and/or CLK 2 as needed, in the manner described herein.

Figure 13:
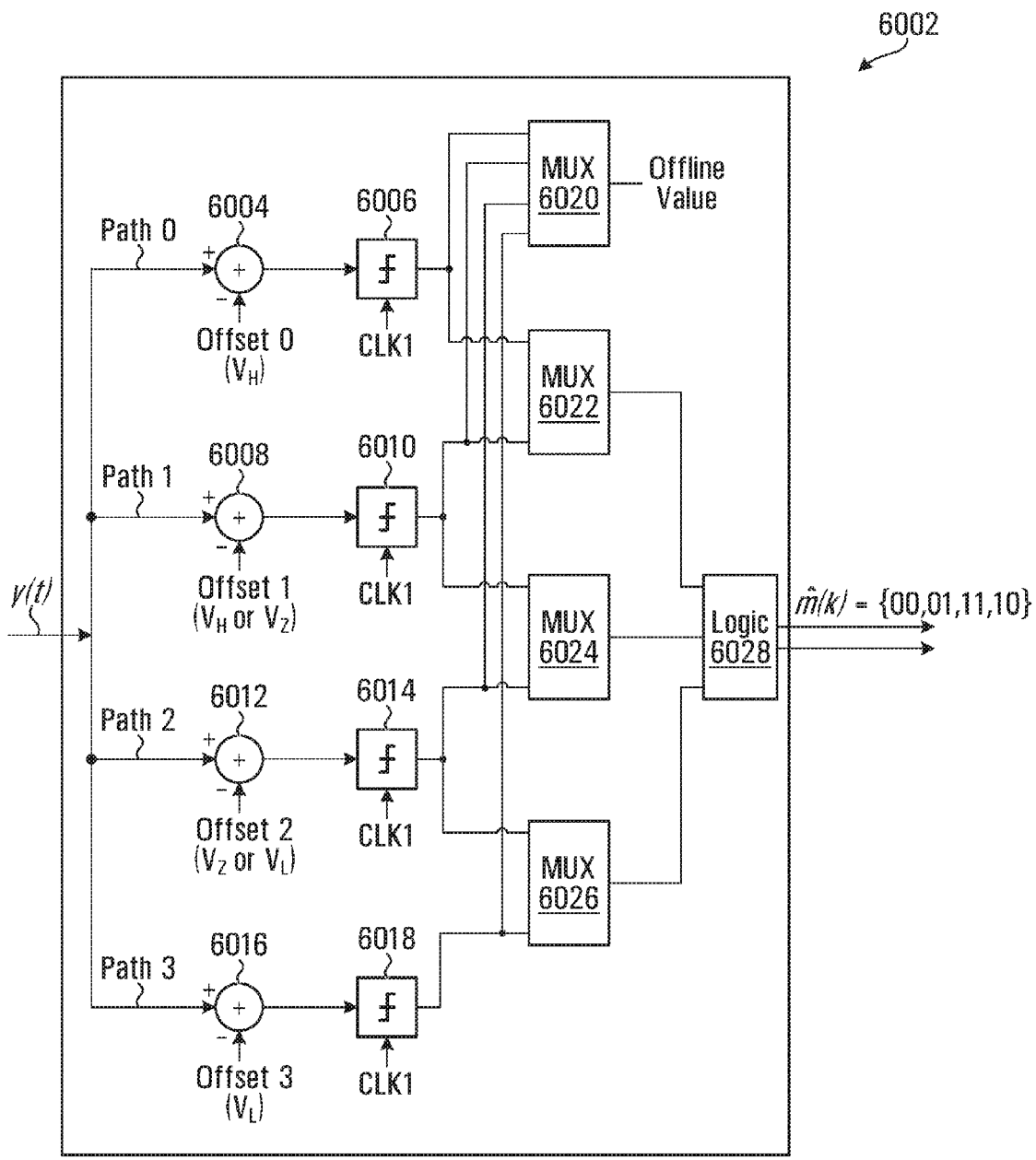
FIG. 13 is one example of a 4-PAM detector.

One example of the 4-PAM detector in sub-element 1 is illustrated in FIG. 13. The 4-PAM detector of sub-element 2 may have the same structure, but would operate using CLK 2 instead. The FIG. 13 detector is described in detail in U.S. patent application Ser. No. 14/806,346, filed on Jul. 22, 2015, and which is hereby incorporated by reference. For completeness, it will also be summarized here. A 4-PAM detector 6002, as shown in FIG. 13, converts an input signal y(t) to a decision m̂(k)={00, 01, 11, 10}. The detector 6002 includes four circuit branches, or branch paths, which are respectively labelled "Path 0", "Path 1", "Path 2", and "Path 3". Each branch path receives the input signal y(t), adjusts it by an offset, and then the resulting signal is fed to a slicer. Specifically, in "Path 0" an adjustor 6004 subtracts an "Offset 0" from y(t), and the result is sliced by slicer 6006. Similarly, in "Path 1" an adjustor 6008 subtracts an "Offset 1" from y(t), and the result is sliced by slicer 6010, in "Path 2" an adjustor 6012 subtracts an "Offset 2" front y(t), and the result is sliced by slicer 6014, and in "Path 3" an adjustor 6016 subtracts an "Offset 3" from y(t), and the result is sliced by slicer 6018.

The detector 6002 further includes multiplexers 6020, 6022, 6024, and 6026. Multiplexer 6020 receives at its input the output of each of "Path 0" to "Path 3". Multiplexer 6020 selects one of the branch paths as the offline path. Multiplexer 6022 receives at its input the output of "Path 0" and "Path 1", and selects one of these branches as a first data path. Similarly, multiplexer 6024 receives at its input the output of "Path 1" and "Path 2" and selects one of these branches as the second data path, and multiplexer 6026 receives at its input the output of "Path 2" and "Path 3" and selects one of these branches as the third data path. Logic circuitry 6028 receives the output of each of multiplexers 6022, 6024, and 6026 (i.e. the output of each of the selected data paths) and converts this to decision iii(k), e.g. using a truth table.

During operation of the detector 6002, the input signal y(t) travels through each of the branch paths "Path 0" to "Path 3". In each branch path, the offset is subtracted from the branch signal y(t), and then that value is sliced. For example, in "Path 0", "Offset 0" is subtracted from y(t) at 6004, and the resulting signal is sliced by slicer 6006. The multiplexer 6020 selects one of the paths as the offline path, and the multiplexers 6022, 6024, and 6026 select the other three paths as the data paths, with the path selected as the offline path being periodically changed during operation so that over time each of "Path 0" to "Path 3" is sequentially selected as the offline path in a round-robin fashion. In particular, over time the following selections are made by the multiplexers 6020, 6022, 6024, and 6026, and the following offsets are assigned to each of the selected data branches:

| MUX 6020 ("Offline Path") | MUX 6022 ("First Data Path") | MUX 6024 ("Second Data Path") | MUX 6026 ("Third Data Path") |
|---|---|---|---|
| Path 0 | Path 1 | Path 2 | Path 3 |
|  | Offset 1 = $V_H$ | Offset 2 = $V_Z$ | Offset 3 = $V_L$ |
| Path 1 | Path 0 | Path 2 | Path 3 |
|  | Offset 0 = $V_H$ | Offset 2 = $V_Z$ | Offset 3 = $V_L$ |
| Path 2 | Path 0 | Path 1 | Path 3 |
|  | Offset 0 = $V_H$ | Offset 1 = $V_Z$ | Offset 3 = $V_L$ |
| Path 3 | Path 0 | Path 1 | Path 2 |
|  | Offset 0 = $V_H$ | Offset 1 = $V_Z$ | Offset 2 = $V_L$ |
| Path 2 | Path 0 | Path 1 | Path 3 |
|  | Offset 0 = $V_H$ | Offset 1 = $V_Z$ | Offset 3 = $V_L$ |
| Path 1 | Path 0 | Path 2 | Path 3 |
|  | Offset 0 = $V_H$ | Offset 2 = $V_Z$ | Offset 3 = $V_L$ |

Different sequences are also possible. The six options outlined in the table above are cycled through during operation. When a branch path is taken offline, its output is not used to generate the decision m̂(k), rather the other three branches are used, as per the table above.

When a branch path is offline its slicing threshold may be adapted for the 4-PAM sub-eye it is going to slice when it is placed back online. For each offline branch, per phase correlation values, $C_{pathxA}$ and $C_{pathxB}$ (assuming two-way time-interleaving), may be and computed in the same manner as described above in relation to FIG. 11 to ultimately obtain a per-phase ISI value for each 4-PAM detector, which is sent to the timing skew determination module. That is, the offline value (called error value) from multiplexer 6020, e[k], may be correlated with the previous decision value, d[k−1], using the following LMS update equations:

$$C_{pathxA}^{j+1} = C_{pathxA}^{j} + \mu e[k]d[k-1], \text{ for odd values of } k$$

$$C_{pathxB}^{j+1} = C_{pathxB}^{j} + \mu e[k]d[k-1] \text{ for even values of } k$$

where:
d[k−1] is either −3, −, +1, or +3 corresponding to m̂(k)=(00, 01, 11, 11, 10) respectively, and
e[k], is either −1 or +1 when the error signal is not erroneous or 0 when the error signal is erroneous.

Following the same sequence as in the previous table, the table below indicates the conditions where the error signal is valid. The value "ECL" corresponds to the 4-PAM sub-eye cursor level. It can be used to set the signal level at the output of an Automatic Gain Control Amplifier, or alternatively ECL can be set adaptively if the signal level coming in the 4-PAM receiver is fixed (i.e. cannot be adjusted).

When the per-phase correlation values from all the branch paths have been computed as per the description above, the overall correlation corresponding to CLK 1 and $C_B$ corresponding to CLK 2 are obtained by summing the per-phase correlations from each branch path, with appropriate weighting to account for the fact that more time (2×) is spent accumulating correlation values for Path 1 and Path 2 compared to Path 0 and Path 3.

| Selection | Offline Path | Offline Path Offset | e[k] valid when: |
|---|---|---|---|
| 1 | Path 0 | $V_H$ + ECL | Valid (+1/−1) only when d[k] = +3 |
| 2 | Path 0 | $V_H$ − ECL | Valid (+1/−1) only when d[k] = +1 |
| 3 | Path 1 | $V_Z$ + ECL | Valid (+1/−1) only when d[k] = +1 |
| 4 | Path 1 | $V_Z$ − ECL | Valid (+1/−1) only when d[k] = −1 |
| 5 | Path 2 | $V_L$ + ECL | Valid (+1/−1) only when d[k] = −1 |
| 6 | Path 2 | $V_L$ − ECL | Valid (+1/−1) only when d[k] = −3 |
| 7 | Path 3 | $V_L$ + ECL | Valid (+1/−1) only when d[k] = −1 |
| 8 | Path 3 | $V_L$ − ECL | Valid (+1/−1) only when d[k] = −3 |
| 9 | Path 2 | $V_Z$ + ECL | Valid (+1/−1) only when d[k] = +1 |
| 10 | Path 2 | $V_Z$ − ECL | Valid (+1/−1) only when d[k] = −1 |
| 11 | Path 1 | $V_H$ + ECL | Valid (+1/−1) only when d[k] = +3 |
| 12 | Path 1 | $V_H$ − ECL | Valid (+1/−1) only when d[k] = +1 |

FIG. 12 may be implemented in a 4-PAM transceiver.

More generally, the embodiments described herein may be used in communication products including, but not limited to: high speed serializer/deserializer (SERDES) receivers, advanced modulation receivers, clock/data recovery (CDR) devices, decision feedback equalizers (DFE), high speed analog/digital converters (ADC) for adaptive equalization of lossy transmission and other communication impediments, and/or the extraction of advanced modulation signals from the transmitted protocol. All of the above devices have in common time interleaved clocking whose skew performance may be improved by one or more embodiments described herein.

The invention claimed is:
1. An M-PAM receiver, where M≥4, comprising:
a plurality of M-PAM detectors;
at least one clock generator circuit to generate a plurality of clocks, each one of the plurality of clocks to be generated to have the same clock frequency but a different clock phase, and each one of the plurality of clocks to be used in a respective different one of the plurality of M-PAM detectors;
circuitry to determine a plurality of intersymbol interference (ISI) values, one for each of the plurality of clocks, by: for each clock of the plurality of clocks, sampling a signal in a respective M-PAM detector using the clock to obtain a sampled signal and determining a value representing ISI based on the sampled signal;
a timing skew determination module to receive the plurality of ISI values and instruct that a clock phase of at least one of the plurality of clocks be adjusted in response to at least one of the plurality of ISI values being different from a reference ISI value;
wherein M=4, and wherein a particular 4-PAM detector associated with a particular clock comprises four branches; each one of the four branches having: (i) an adjustor to adjust an input signal by a respective offset to obtain a respective adjusted signal, and (ii) a slicer to slice the respective adjusted signal using the par- ticular clock; wherein one of the four branches is an offline branch and the remaining three branches form a data decision value.

2. The M-PAM receiver of claim 1, wherein the particular 4-PAM detector further comprises a selector to select one of the four branches as the offline branch, the offline branch selected to change during operation such that each one of the four branches is the offline branch at a respective different point in time during the operation and the remaining three branches form the data decision value.

3. The M-PAM receiver of claim 1, wherein the circuitry to determine the plurality of ISI values is to determine the value representing ISI associated with the particular clock using an output of the offline branch.

4. The M-PAM receiver of claim 1, wherein the timing skew determination module is to instruct that the clock phase of at least one of the plurality of clocks be adjusted by: at least generating an instruction to adjust a clock phase of a selected one of the plurality of clocks in a direction dependent upon whether an ISI value associated with the selected one of the plurality of clocks is less than or greater than the reference ISI value.

5. The M-PAM receiver of claim 4, wherein the reference ISI value is an average of the plurality of ISI values, and wherein the timing skew determination module is to compute the average of the plurality of ISI values to obtain the reference ISI value.

6. The M-PAM receiver of claim 4, wherein the reference ISI value is an ISI value associated with one of the plurality of clocks.

7. The M-PAM receiver of claim 4, wherein the instruction is further to adjust the clock phase of the selected one of the plurality of clocks by an amount dependent upon a difference in magnitude between the ISI value associated with the selected one of the plurality of clocks and the reference ISI value.

8. An M-PAM receiver, where M≥4, comprising:
a plurality of M-PAM detectors;
at least one clock generator circuit to generate a plurality of clocks, each one of the plurality of clocks to be generated to have the same clock frequency but a different clock phase, and each one of the plurality of clocks to be used in a respective different one of the plurality of M-PAM detectors;
circuitry to determine a plurality of intersymbol interference (ISI) values, one for each of the plurality of clocks, by: for each clock of the plurality of clocks, sampling a signal in a respective M-PAM detector using the clock to obtain a sampled signal and determining a value representing ISI based on the sampled signal;
a timing skew determination module to receive the plurality of ISI values and instruct that a clock phase of at least one of the plurality of clocks be adjusted in response to at least one of the plurality of ISI values being different from a reference ISI value;
wherein M=4 and there are two 4-PAM detectors, and wherein the at least one clock generator circuit is to generate two clocks, each one of the two clocks to be generated to have the same clock frequency but a different clock phase.

9. A method performed in an M-PAM receiver, where M≥4, the method comprising:
generating a plurality of clocks, each one of the plurality of clocks generated to have the same clock frequency but a different clock phase, and each one of the plurality of clocks used in a respective different one of a plurality of M-PAM detectors;
determining a plurality of intersymbol interference (ISI) values, one for each of the plurality of clocks, by: for each clock of the plurality of clocks, sampling a signal in a respective M-PAM detector using the clock to obtain a sampled signal and determining a value representing ISI based on the sampled signal; and
adjusting a clock phase of at least one of the plurality of clocks in response to at least one of the plurality of ISI values being different from a reference ISI value;
wherein for a particular 4-PAM detector associated with a particular clock: in each one of four branches of the particular 4-PAM detector, adjusting an input signal by a respective offset to obtain a respective adjusted signal, and then using the particular clock to slice the respective adjusted signal; and wherein one of the four branches is an offline branch and an output of the other three branches form a data decision value.

10. The method of claim 9, wherein for the particular 4-PAM detector:
selecting one of the four branches as the offline branch, and using the output of the other three branches to form the data decision value;
changing the offline branch during operation such that each one of the four branches is the offline branch at a respective different point in time during the operation and the remaining three branches form the data decision value.

11. The method of claim 9 further comprising determining the value representing ISI associated with the particular clock using an output of the offline branch.

12. The method of claim 9, wherein said adjusting the clock phase of at least one of the plurality of clocks comprises adjusting a clock phase of a selected one of the plurality of clocks in a direction dependent upon whether an ISI value associated with the selected one of the plurality of clocks is less than or greater than the reference ISI value.

13. The method of claim 12, wherein the reference ISI value is an average of the plurality of ISI values, and the method further comprises computing the average of the plurality of ISI values to obtain the reference ISI value.

14. The method of claim 12, wherein the reference ISI value is an ISI value associated with one of the plurality of clocks.

15. The method of claim 12, further comprising adjusting the clock phase of the selected one of the plurality of clocks by an amount dependent upon a difference in magnitude between the ISI value associated with the selected one of the plurality of clocks and the reference ISI value.

16. A method performed in an M-PAM receiver, where M≥4, the method comprising:
generating a plurality of clocks, each one of the plurality of clocks generated to have the same clock frequency but a different clock phase, and each one of the plurality of clocks used in a respective different one of a plurality of M-PAM detectors;
determining a plurality of intersymbol interference (ISI) values, one for each of the plurality of clocks, by: for each clock of the plurality of clocks, sampling a signal in a respective M-PAM detector using the clock to obtain a sampled signal and determining a value representing ISI based on the sampled signal; and
adjusting a clock phase of at least one of the plurality of clocks in response to at least one of the plurality of ISI values being different from a reference ISI value;

wherein M=4 and there are two 4-PAM detectors, and wherein two clocks are generated, each one of the two clocks corresponding to a respective one of the 4-PAM detectors, and each one of the two clocks having the same clock frequency but a different clock phase.

* * * * *